United States Patent
Greer et al.

(10) Patent No.: US 11,326,061 B2
(45) Date of Patent: May 10, 2022

(54) HIGH CONTENT POLYAMIDE HOT-APPLIED THERMOPLASTIC COMPOSITION

(71) Applicant: Flint Trading, Inc., Thomasville, NC (US)

(72) Inventors: Robert W. Greer, Lexington, NC (US); Derron Henderson, Marietta, GA (US); Vince Wilkins, Smyrna, GA (US)

(*) Notice: Subject to any disclaimer, the term of this patent is extended or adjusted under 35 U.S.C. 154(b) by 54 days.

(21) Appl. No.: 16/887,872

(22) Filed: May 29, 2020

(65) Prior Publication Data

US 2020/0291242 A1 Sep. 17, 2020

Related U.S. Application Data

(63) Continuation of application No. 16/284,757, filed on Feb. 25, 2019, now Pat. No. 10,703,916, which is a (Continued)

(51) Int. Cl.
*E01C 23/00* (2006.01)
*C09D 5/33* (2006.01)
(Continued)

(52) U.S. Cl.
CPC .............. *C09D 5/004* (2013.01); *C09D 7/48* (2018.01); *C09D 7/61* (2018.01); *C09D 7/62* (2018.01);
(Continued)

(58) Field of Classification Search
CPC ...... C09D 5/004; C09D 7/48; C09D 7/61–63; C09D 177/00; C09D 193/04; C08K 3/40;
(Continued)

(56) References Cited

U.S. PATENT DOCUMENTS

| 2,689,801 A | 9/1954 | D Alelio |
| 3,005,790 A | 10/1961 | Wynn et al. |

(Continued)

FOREIGN PATENT DOCUMENTS

| GB | 1251377 | 10/1971 |
| KR | 1020090076472 | 11/2010 |
| WO | 2014070229 | 5/2014 |

OTHER PUBLICATIONS

Technical Bulletin, JAD2000-0206. JeffAmine D-2000 Amine. Huntsman Corporation 2006.
(Continued)

*Primary Examiner* — Raymond W Addie
(74) *Attorney, Agent, or Firm* — Kilpatrick Townsend & Stockton LLP

(57) ABSTRACT

A hot applied thermoplastic pavement composition and method of using a hot applied thermoplastic pavement composition includes a modified polyamide resin in the range of between 3 and 10 percent by weight, wherein the composition contains rosin-modified esters, a copolymer, 30-70 percent by weight of a glass bead intermix, a range of between 1 and 15 percent by weight of either white or yellow pigment, the balance of the composition being selected from the group consisting of one or more plasticizers, inorganic fillers, waxes, antioxidants and light stabilizers.

20 Claims, 15 Drawing Sheets

Related U.S. Application Data continuation of application No. 15/695,538, filed on Sep. 5, 2017, now Pat. No. 10,214,649, which is a continuation of application No. 15/296,284, filed on Oct. 18, 2016, now Pat. No. 9,790,372, which is a continuation of application No. 14/475,701, filed on Sep. 3, 2014, now Pat. No. 9,499,948.

(51) Int. Cl.

| | |
|---|---|
| *E01C 23/16* | (2006.01) |
| *E01C 23/20* | (2006.01) |
| *C09D 193/04* | (2006.01) |
| *C09D 177/00* | (2006.01) |
| *E01F 9/506* | (2016.01) |
| *E01F 9/518* | (2016.01) |
| *C09D 7/61* | (2018.01) |
| *C09D 7/48* | (2018.01) |
| *C09D 7/63* | (2018.01) |
| *C09D 7/62* | (2018.01) |
| *E01C 23/14* | (2006.01) |
| *C08K 3/40* | (2006.01) |
| *C08K 7/20* | (2006.01) |
| *C08K 5/00* | (2006.01) |

(52) U.S. Cl.
CPC ............ *C09D 7/63* (2018.01); *C09D 177/00* (2013.01); *C09D 193/04* (2013.01); *E01C 23/14* (2013.01); *E01C 23/16* (2013.01); *E01C 23/166* (2013.01); *E01C 23/20* (2013.01); *E01C 23/206* (2013.01); *E01F 9/506* (2016.02); *E01F 9/518* (2016.02); *C08K 3/40* (2013.01); *C08K 5/005* (2013.01); *C08K 7/20* (2013.01)

(58) Field of Classification Search
CPC . C08K 5/005; C08K 7/20; E01F 9/506; E01F 9/518; E01C 23/14; E01C 23/16; E01C 23/166; E01C 23/20; E01C 23/206
USPC .......................................... 404/17, 72, 75, 94
See application file for complete search history.

(56) References Cited

U.S. PATENT DOCUMENTS

| | | | |
|---|---|---|---|
| 3,204,132 A | 8/1965 | Benaglio et al. | |
| 3,459,106 A | 8/1969 | Johnson | |
| 3,935,158 A * | 1/1976 | Watanabe | C09D 5/004 523/172 |
| 4,105,808 A | 8/1978 | McKenzie | |
| 4,324,711 A | 4/1982 | Tanaka et al. | |
| 4,373,670 A | 2/1983 | Kilner | |
| 5,536,569 A | 7/1996 | Lasch et al. | |
| 6,412,957 B1 | 7/2002 | Oba | |
| 6,552,110 B1 | 4/2003 | Yalvac et al. | |
| 6,576,074 B1 | 6/2003 | Cabrera et al. | |
| 7,753,616 B2 | 7/2010 | Greer et al. | |
| 8,573,882 B2 | 11/2013 | Greer et al. | |
| 9,340,934 B2 * | 5/2016 | Carlson | C09D 123/0869 |
| 9,790,372 B1 | 10/2017 | Greer et al. | |
| 9,932,476 B2 * | 4/2018 | Kugel | C08L 77/00 |
| 10,214,649 B2 | 2/2019 | Greer et al. | |
| 10,801,168 B2 * | 10/2020 | Fasula | C09D 7/65 |
| 2003/0156901 A1 | 8/2003 | Britt | |
| 2005/0014912 A1 | 1/2005 | Hirota et al. | |
| 2005/0245645 A1 * | 11/2005 | Howie, Jr. | C08L 69/00 524/1 |
| 2007/0253772 A1 | 11/2007 | Kubo et al. | |
| 2009/0067924 A1 | 3/2009 | Kaul | |
| 2009/0214827 A1 * | 8/2009 | Howie, Jr. | C08L 33/08 428/143 |
| 2010/0055374 A1 | 3/2010 | Greer et al. | |
| 2010/0210745 A1 | 8/2010 | McDaniel | |
| 2011/0123769 A1 | 5/2011 | Greer et al. | |
| 2011/0195179 A1 | 8/2011 | Davies et al. | |
| 2011/0262747 A1 | 10/2011 | Yalvac | |
| 2012/0092767 A1 | 4/2012 | Naik et al. | |
| 2012/0236413 A1 | 9/2012 | Budd et al. | |
| 2014/0140767 A1 | 5/2014 | Vitale et al. | |
| 2014/0193576 A1 | 7/2014 | Carlson | |
| 2014/0347731 A1 | 11/2014 | Tillotson et al. | |
| 2016/0024338 A1 | 1/2016 | Puffer, Sr. | |
| 2016/0060829 A1 | 3/2016 | Greer et al. | |
| 2019/0055704 A1 | 2/2019 | Fasula et al. | |

OTHER PUBLICATIONS

National Transportation Product Evaluation program (NTPEP) Pavement marking Materials Data Usage Guide. [online]. AASHTO—The Voice of Transportation. [retrieved on Aug. 29, 2014]. Retrieved from Internet: http://www.ntpep.org/Documents/Technical_Committee/PMM/PMMUserGuide.pdf>. 4 pages.

California Test 423. "Methods for Testing Thermoplastic Traffic Line Material". Department of Transportation, Division of Engineering Services, Dec. 2006.

Florida Department of Transportation. [online]. Section 971. "Traffic Marking Materials" (REV Jan. 8, 2014)(FA Jan. 15, 2014) (Jul. 2014). [retrieved Apr. 24, 2014]. Retrieved from the Internet: ftp://ftp.dot.state.fl.us/LTD/CO/Specifications/SpecBook/2010Book/971.pdf>. 13 pages.

AASHTO Designation: M247-11. "Glass Beads Used in Pavement Markings". Standard specification. 2011.

AASHTO Designation: M249-09. White and Yellow Reflective Thermoplastic Striping Material (Solid Form). Standard Specification. 2010.

EP 15838379.4, "Extended European Search Report," dated Jan. 15, 2018 (9 pages).

* cited by examiner

HIGH CONTENT POLYAMIDE HOT-APPLIED THERMOPLASTIC COMPOSITION

PRIORITY

This application is a Continuation of and claims benefit under 35 USC 120 of U.S. Non-Provisional application Ser. No. 15/296,284, filed Oct. 18, 2016 which is a continuation of U.S. Nonprovisional application Ser. No. 14/475,701 filed on Sep. 3, 2014, which granted Nov. 22, 2016 as U.S. Pat. No. 9,499,948, and corresponding PCT/US2015/047484, filed Aug. 28, 2015, all entitled "High Content Polyamide Hot-Applied Thermoplastic Composition". The above referenced applications are hereby incorporated in their entirety by reference for all purposes.

FIELD OF THE INVENTION

The invention relates to hot-applied thermoplastic pavement compositions with polyamide resin content in the range of 3-10 percent by weight with at least 30 weight % bead intermix using AASHTO M 247 Type 3 and Type 1 or AASHTO M 247 Type 4 and Type 1 beads to impart superior durability, bond strength and increased retro-reflectivity to the applied surface. This composition represents a significant improvement over the currently available hot-applied thermoplastic pavement marking products. The increase in the polyamide resin content is shown to be particularly important for improved wear-resistance, low-temperature impact, resistance to cracking from freeze-thaw conditions and the prevention of delamination.

BACKGROUND OF THE INVENTION

Traffic markings convey information to drivers and pedestrians by providing exposed, visible, reflective, colored and/or tactile surfaces that serve as indicia. In the past, this function was conventionally accomplished by painting a traffic surface. Modern marking materials offer significant advantages over paint including dramatically increased visibility and/or reflectance, improved durability, and temporary removable marking options. Examples of modern pavement marking materials include; thermoplastics, pavement marking sheet materials, tapes and raised pavement markers. For the purposes of this application, the terms "marker" and "marking" can be used interchangeably.

Preformed and hot applied thermoplastic materials used as pavement markings or other indicia possess many advantages compared to paints and other less durable markings. These materials can be used applied and used in service conventionally for years—much longer than those composed of paints.

The United States has 2,605,331 miles (4,192,874 km) of paved roads. According to the Federal Highway Administration, the United States Interstate Highway System, as of 2011, has approximately 48,000 miles of marked roadways and the US National Highway System has approximately 160,000 miles of marked roadways. Therefore, there is an increasing need for more durable, resistant, and therefore longer-lived thermoplastic compositions for roadway markings. Further needed improvements, more specifically in the area of hot-applied thermoplastics, include: higher impact resistance to road maintenance efforts and roadway usage including snow plows, very low wear characteristics, allowing for a significantly longer performance lifetime and the ability to host a high content bead intermix for long-term retro-reflectivity, and enhanced freeze-thaw resistance.

These issues demonstrate that there remains a need for polyamide enhanced hot-applied thermoplastic products that provide significantly higher impact resistance, increased longevity and durability, and improved freeze-thaw resistance. This ensures the integrity of the product (and pattern if so desired), is maintained for an increased amount of time over currently available hot-applied thermoplastic compositions.

DESCRIPTION OF RELEVANT ART

U.S. Pat. No. 6,552,110 to Yalvac, et al. and jointly assigned to Dow Global Technologies and Nor-Skilt, describes thermoplastic marking compositions. The subject invention pertains to thermoplastic marking compositions comprising a binder, which in turn comprise at least one homogeneous polymer. Accordingly, the subject invention provides a thermoplastic marking composition comprising: (a) from 10 to 80 weight percent of a binder, which in turn comprises: (i) from 1 to 99 weight percent of at least one homogeneous polymer; (ii) from 5 to 70 weight percent of at least one tackifier; (iii) from 0 to 10 weight percent of a polyethylene which has pendant acid functionality moieties of a non-functionalized wax; and (iv) from 0 to 20 weight percent of a plasticizer; and (b) from 20 to 90 weight percent of an inorganic filler. The subject formulations are usefully applied via spray, screed, and extrusion techniques.

Korean Patent No. 100990964 to Seong Jo Lee, and assigned to Buseong Polycom Co., Ltd., describes thermoplastic polyamide resin for use as a binder for an anti-slipping agent for road marking compositions where added benefits of the polyamide resin to the thermoplastic marker include prevention of gradient increase of the marking during application and prevention of the generation of cracking once applied. The marking composition disclosed provides for including a dimer fatty acid with a compound selected from a group containing various acids, including sebacic acid and azelaic acid. The amine is incorporated and formed with a compound selected from a group consisting of various diamines.

U.S. Pat. No. 4,324,711 to Tanaka et al, and assigned to Atom Chemical Paint Co. Ltd., describes a melt-adhesive traffic paint composition having improved low temperature stability consisting essentially of 20-35% by weight of a dimer acid modified polyamide resin, the polyamide resin being prepared by condensing a dimer acid with a polyamine selected from the group consisting of ethylenediamine and diethylenetriamine, 1-5% by weight of a plasticizer selected from the group consisting of a phthalate, a trimellitate, a mixture of saturated linear $C_6$, $C_8$ and $C_{10}$ alcohols, a mixture of saturated linear $C_8$ and $C_{10}$ alcohols and a toluenesulfonamide, 30-45% by weight of an inorganic filler, the balance being a coloring pigment and a reflective agent. Also disclosed within this granted patent, is the composition of thermoplastic resin in the amount of 2% to 15% by weight of the composition and as claimed, selected from the group consisting of hydrogenated rosin and rosin-modified maleic acid resins.

Improvements over the above mentioned compositions from Atom Chemical Paint include improved long term retro-reflectivity, as once the top layer of the aforementioned traffic marking system wears, the thermoplastic composition will not wear fast enough to provide retroreflection with a glass bead content of 16%, which is also no longer 30% minimum AASHTO compliant. Without a formulated balance of polymer and modified tall oil or rosin ester, this system would be expected to not wear properly. Hard resins (or rosin-modified maelic acid resins) are included in the Tanaka formulations while the newly disclosed formulations provide for the use of pentaerythritol modified ester (no maleic modification) and a glycerol modified maleic modified ester of rosin and expressly without the inclusion of rosin-modified maleic resins.

Compositional differences also exist in a 40% binder by weight from the inclusion of the polyamide and the hard resin alone, while the new compositions show a binder percentage by weight within a range of 22% to 24%.

Previous formulations including higher polyamide content than normally available have been publicly manufactured and marketed by the assignee, Ennis-Flint of Thomasville, N.C., under the commercial trademark, Permaline®. Permaline® is formulated with a polyamide content less than 3% and is a primerless system for asphalt and concrete surface markings. The incorporation of polyamide provides excellent bond strength and durability for high average daily traffic (ADT) roads. This product is manufactured using polyamide grade PAF2526c, a proprietary polyamide formulated by Ennis-Flint.

The disclosed review of the relevant art shows the need for a hot-applied thermoplastic pavement marking composition that maintains increased retro-reflective ability, increased resistance to environmental stresses, and increased durability over those compositions which are currently commercially available.

SUMMARY OF THE INVENTION

The present disclosure describes a high polyamide content thermoplastic pavement marking composition, normally used as a hot-applied thermoplastic, with improved physical characteristics allowing for a highly durable and resistant pavement marking that alleviates the need for replacement/remarking within the standard replacement/remarking timeframe.

Conventional thermoplastic pavement markers use alkyd resins, derived from pine trees, as the main binder or another accepted thermoplastic system using hydrocarbon-based $C_5$ resins. Normal thermoplastic becomes embrittled and therefore is highly susceptible to cracking and delamination during freeze-thaw conditions and along any propagating cracks in the surface of the roadway.

The present invention requires hot-applied thermoplastic pavement compositions have lower polyamide resin content in the range of 3 to 10 percent by weight with at least a 30 weight % bead intermix. The bead mix is specific to using AASHTO Type 3 and Type 1 for example (30%/30%) or (15%/15%) or AASHTO Type 4 and Type 1 beads for example (25% each) to impart increased retro-reflectivity to the applied surface. In addition, the pavement compositions contain a range of between 1 and 15 percent by weight of either white or yellow pigment, the balance being selected from the group consisting of; one or more plasticizers, inorganic fillers, waxes, antioxidants and light stabilizers.

This composition represents a significant improvement over currently available hot-applied thermoplastic pavement marking products. The increase in the polyamide resin content has been shown to be particularly important for improved wear-resistance, low-temperature impact, resistance to cracking from freeze-thaw conditions and the prevention of delamination.

DESCRIPTION

Current thermoplastic pavement markers do not normally include the use of polyamide resins. Polyamide resins are polycondensation products of dimerized fatty acids and polyamines, and contain recurring amide groups (—CO—NH—) in the main polymer chain. The properties of polyamide materials are affected by the presence of highly polar amide groups and also by the length of the hydrocarbon backbone. This class of materials possesses high temperature resistance and good mechanical strength.

Historically, polyamide resins were not a conventional choice for use as the main binder in thermoplastic systems, primarily due to perceived increased costs of standard formulations that would have little or no improvements in performance. In the present disclosure, the inclusion of the polyamide resin with the formulations described yields durable, flexible, freeze-thaw resistant pavement marking products that do not crack during conventional expansion and contraction of the pavement surface as evidenced with previous formulations. Other earlier formulations have become embrittled with time, causing cracking leading to premature failure on pavement surfaces. The current disclosure also provides for an improved polyamide hot-applied thermoplastic is formulated expressly without the inclusion of sebacic acid.

Polyamides are tough which includes exhibiting higher flexural modulus than most alternative polymer systems and certain polyamide resins exhibit very low wear over time. The newly provided high-content polyamide hot-applied thermoplastic composition comprises, optimally, a 7% polyamide resin in combination relatively high concentrations of maleated maleic resin (alkyd resin). Other additives, discussed herein, contribute to the combination of formulations that include; stable viscosity, enhanced durability, and optimal glass bead suspension.

To achieve the desired properties using increased polyamide content in hot-applied thermoplastic formulations, certain attributes not shown with the accepted formulations must be considered and achieved. In order to produce a suitable polyamide polymer for this application dimer acids incorporated with polyamide resins are not employed. Instead the present disclosure incorporates the use of amine monomers that reduce the hydrogen bonding characteristics of the polyamides by either:

1. increasing the molecular weight between amide linkages by using a higher weight diamine such as Jeffamine® D2000 polyoxypropylenediamine, a polyetheramine with a molecular weight of approximately 2000 g/mol, or
2. eliminating the hydrogen bond by using a secondary amine co-monomer such as piperazine (FIG. 1), the simplest cyclic member of the ethyleneamines, containing two secondary amine groups, which when polymerized does not have a free hydrogen molecule necessary for hydrogen bonding.

FIG. 1

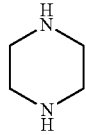

Piperazine ($C_4H_{10}N_2$)-(CAS NO. 110-85-0)

A higher weight di-functional primary amine, for example, Jeffamine® D2000, commercially available from Huntsman Corporation of Woodlands, Tex., has amine groups located on secondary carbon atoms at the ends of an aliphatic polyether chain and is completely miscible in a wide variety of solvents, but only slightly soluble in water. Widely used in polyurea and polyurethane applications, polyoxypropylenediamine exhibits a fast reacting nature with isocyanates, functions as a co-reactant in epoxy systems, imparting flexibility and toughness, and provides enhanced peel strengths in adhesive systems. The chemical structure of Jeffamine® D2000 polyoxypropylenediamine is provided in FIG. 2.

Standard specifications for the glass beads are provided in "Glass Beads Used in Pavement Markings" (AASHTO Designation: M 247-11), the scope of which covers glass beads to be dropped or sprayed upon pavement markings so as to produce a pavement marking with satisfactory retro-reflectivity. Gradation requirements provided therein are included in Table 1.

TABLE 1

| Gradation of Glass Beads | | | | | | | |
|---|---|---|---|---|---|---|---|
| Sieve Designation | | Mass Percent Passing | | | | | |
| Standard, mm | Alternate No. | Type 0 | Type 1 | Type 2 | Type 3 | Type 4 | Type 5 |
| 2.35 | 8 | | | | | | 100 |
| 2.00 | 10 | | | | | 100 | 95-100 |
| 1.70 | 12 | | | | 100 | 95-100 | 80-95 |
| 1.40 | 14 | | | | 95-100 | 80-95 | 10-40 |
| 1.18 | 16 | | 100 | 100 | 80-95 | 10-40 | 0-5 |
| 1.00 | 18 | | | | 10-40 | 0-5 | 0-2 |
| 0.850 | 20 | | | 95-100 | 90-100 | 0-5 | 0-2 |
| 0.710 | 25 | | | | 0-2 | | |
| 0.600 | 30 | 100 | | 75-95 | 50-75 | | |
| 0.425 | 40 | 90-100 | | | 15-45 | | |
| 0.300 | 50 | 50-75 | | 15-35 | 0-15 | | |
| 0.180 | 80 | 0-5 | | | 0-5 | | |
| 0.150 | 100 | | | 0-5 | | | |

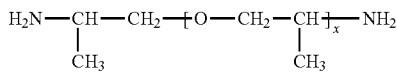

FIG. 2

Polyoxypropylenediamine (CAS No. 9046-10-0)

$x = 33.1$

Another embodiment of the present invention includes the use of amine monomers that add flexibility to the backbone in order to improve low temperature impact resistance (for example, as needed when snow plows are used over the pavement surface). In order to achieve this desired property of low temperature impact resistance, a polyetheramine is the preferred diamine.

Known materials using high friction aggregates on the surface to improve friction, and therefore anti-skid properties, have been known. The surface applied aggregates provide good initial properties, however as the surface is worn due to traffic, the skid resistance decreases. After surface layers containing anti-skid materials become worn out, these aggregate materials lose their effectiveness and become slippery because they do not contain high friction particles (of sufficient size to provide good skid properties). Conventional thermoplastic markings contain bead contents of 30% by weight, with a conventional high bead content extending up to 40%, having an optimal bead content of 35-40% by weight and include the use of a Type 1, or standard gradation, glass bead.

A properly designed thermoplastic road-marking is intended to wear slowly over time, in such a manner that intermix beads are partially exposed to maintain reflectivity and therefore visibility to the driving public. These polyamide formulations are designed to wear at a much slower rate than the traditional thermoplastic road-marking. Therefore, it becomes necessary to increase the size of the intermixed beads and to increase the overall bead content to impart long-term visibility that can match the life of the marking by maintaining the necessary retroreflectivity.

High-bead content is considered, for purposes of this application to be a 50% intermix of retroreflective, anti-skid material and must include a mix of the combination of large and small diameter glass beads, for example a 25%/25% intermix of Type 3/Type 1 beads or Type 4/Type 1 beads. There are no known municipalities requiring a bead content as high as 50%, and current applications using a Type 3 (large diameter) bead blended with a Type 1 (small diameter) exist using only 20% bead content of each AASHTO bead type for Florida and Alabama. The combination of higher bead content with higher content polyamide thermoplastic formulations results in significant increases in the wear resistance of the present materials. Because this present formulation does not exhibit the same wear as previous thermoplastic marking compositions, higher bead content is needed to assist in improving the long term retro-reflectivity of this slower wearing system.

Additives imparting desired characteristics have been determined based on the desired performance of the road marking. Fumed silica, or ethylene vinyl acetate (EVA) and ethylene maleic anhydride can be used to stabilize the viscosity of the pavement marking and achieve the bead intermix suspension. The most optimal bead suspension properties occur by providing the proper thixotropy formulations. Surface bead suspension can be adjusted by surface coating of the glass beads. Type 1 glass beads possess a dual coated silane/silicone coating. Type 4 glass beads possess an adhesion coating, while a silane or other functional coating could possibly be used. Additional additives are selected for the inclusion various properties such as light stabilizing and UV absorbing properties.

The thixotropic range for the increased polyamide content hot-applied thermoplastic (with standard AASHTO thermo as a reference comparison) is provided in Table 2. The viscosities of the formulations were measured using a Brookfield viscometer (spindle number 4) at 6, 12, 30, and 60 rpm. The viscosity of the increased polyamide pavement marking formulation includes resin that is between 1000 cps and 10000 cps, as measured by a Brookfield viscometer and Brookfield thermosel for elevated temperature testing at 190° C. More preferentially the viscosity is between 1500 cps and 3000 cps with the most preferential viscosity being within the range of 1500 cps and 2500 cps. The softening point of the composition should be between 115° C. and 140° C. with a more preferred range being 120° C. to 130° C.

TABLE 2

Thixotropic Properties of White and Yellow Thermoplastic Markers of the Present Disclosure

| Brookfield Viscosity, 410F, #4 spindle (cps) | White - High Performance - Present Disclosure | White AASHTO | Yellow High Performance - Present Disclosure | Yellow AASHTO |
|---|---|---|---|---|
| 6 rpm | 10,000-35,000 | 8,000-14,000 | 10,000-35,000 | 8,000-18,000 |
| 12 rpm | 5,000-30,000 | 6,000-13,000 | 5,000-30,000 | 6,000-15,000 |
| 30 rpm | 2,000-20,000 | 4,000-8,000 | 2,000-20,000 | 2,000-8,000 |
| 60 rpm | 1,500-10,000 | 2,000-7,000 | 1,500-10,000 | 1,500-7,500 |

Application

Conventional flat line road marking delineation provides an application thickness of the thermoplastic markers in the range of 40-150 mil. Variations in thickness depend on an extrudable or sprayable application method. Sprayable thermoplastic markers are applied at a thickness of 40-100 mil and extrudable thermoplastic markers are applied at a thickness of 90-120 mil. A conventional truck equipped for roadway surface marking via ribbon extrude equipment can apply an extruded hot-applied pavement marking at 1-10 mph.

The high-content polyamide formulation of the present disclosure can also be applied as an inlaid marker, where the material is applied into the pavement after grooving out a portion of the pavement to a depth of approximately 300 mil, or as a profiled marker, where the thermoplastic material forms textures, bumps or profiles extending above the surface of the flat line at varying intervals along the length of the line.

DETAILED DESCRIPTION

Figure 1:
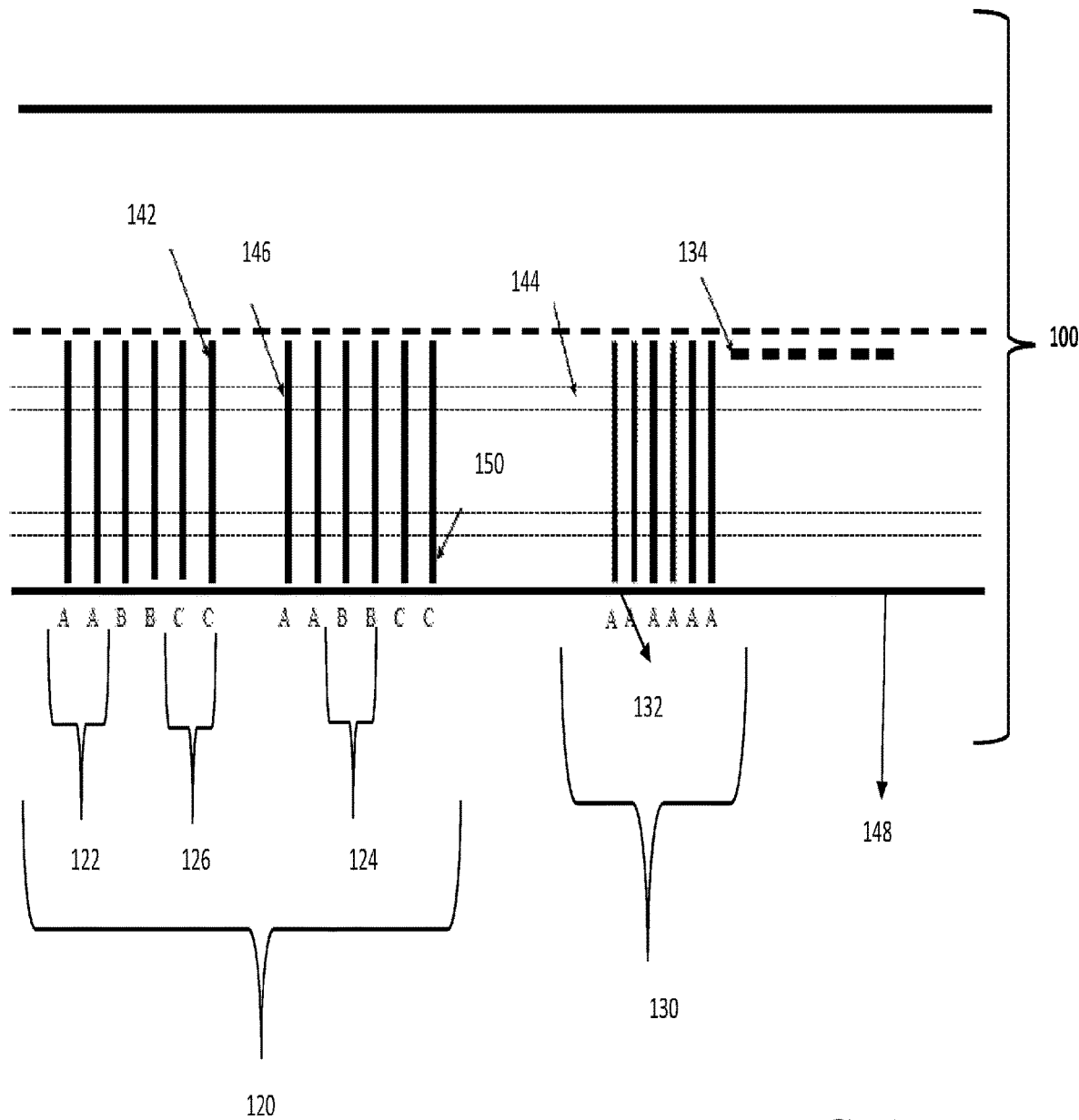
FIG. 1 is a schematic diagram of the AASHTO NTPEP Test Deck Configuration.

The schematic diagram provided in FIG. 1 is an AASHTO NTPEP conventional test deck configuration [100] used for testing of pavement marking materials by the NTPEP Pavement Marking Materials (PMM) Technical Committee (TC). Application of permanent products and non-removable tapes [120] are provided as four (4) lines per manufacturing run of pavement with two (2) lines of either marked at two different locations within the AASHTO NTPEP conventional test deck configuration [100]. Multiple products by different manufacturing runs are denoted as product A [122], B [124], C [126] etc. Temporary Removable Tapes [130] are directed to a test deck application of six (6) transverse lines [132] and 6 longitudinal lines [134].

Readings are taken from the test deck at specified areas of the applied marking and are termed the "skip" reading and the "wheel" reading. The "skip" reading is taken from the marking closest to the skip line [140] of the road, termed the skip reading location [142]. Readings taken in the wheel path closest to the skip line [140] of the road, labeled as the upper wheel path [144], are provided as "wheel" readings and are taken from the wheel reading location [146].

In accordance with the ASTM 2177 wet recovery test, wet retroreflectivity readings are taken within nine (9) inches of the line closest to the road edge line [148], known as the wet reading location [150].

Figure 2A:
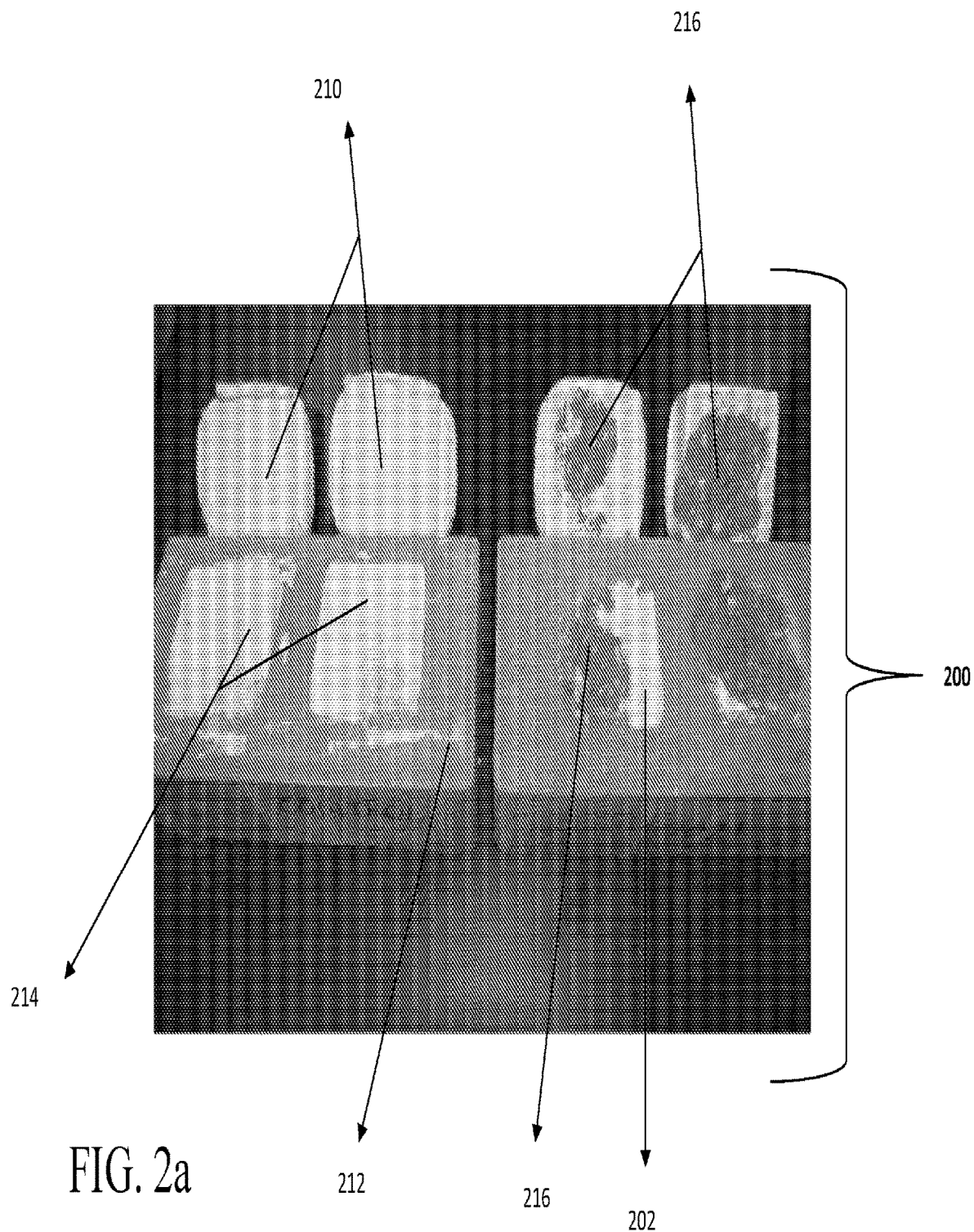
FIGS. 2a-2c provide photographic comparisons of the bond strength of white increased polyamide hot-applied thermoplastic pavement markers and the conventional white AASHTO hot-applied thermoplastic pavement marker.

FIG. 2a is a photographic comparison of the bond strength test results [200] for the white increased polyamide content hot-applied thermoplastic [202] and the conventional AASHTO white hot-applied thermoplastic pavement marker [210] (marked "Control"), as applied to a concrete substrate [212]. The conventional AASHTO white hot-applied thermoplastic pavement marker [210] exhibited significant failure of the marking [214] while the white marker having significantly increased polyamide content hot-applied thermoplastic [202] exhibited significant substrate failure [216].

Figure 2B:
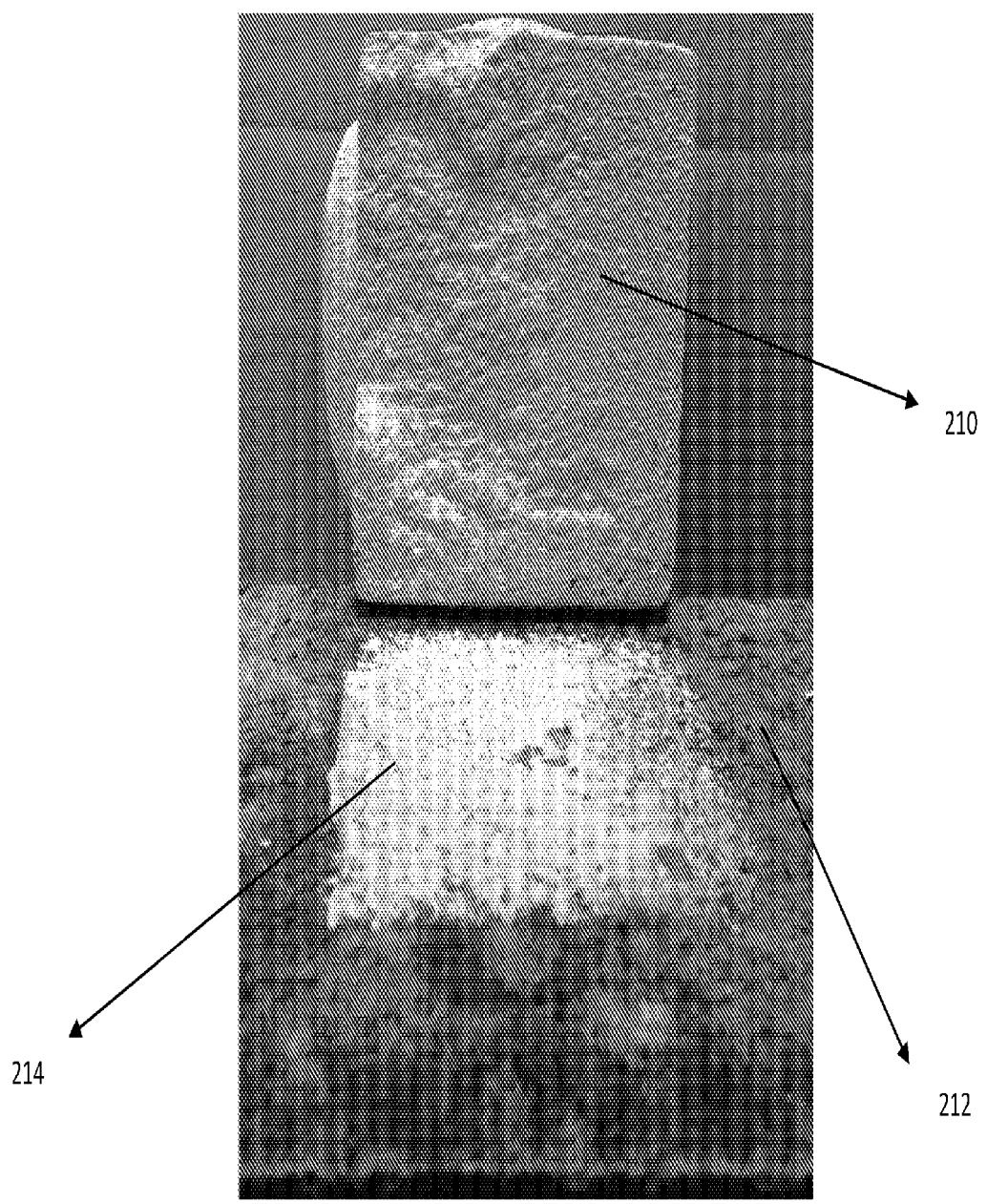

FIG. 2b provides a more detailed photographic depiction of the bond strength of a conventional AASHTO white hot-applied thermoplastic pavement marker [210], as applied to a concrete substrate [212] also exhibiting significant failure of the marking [214].

Figure 2C:
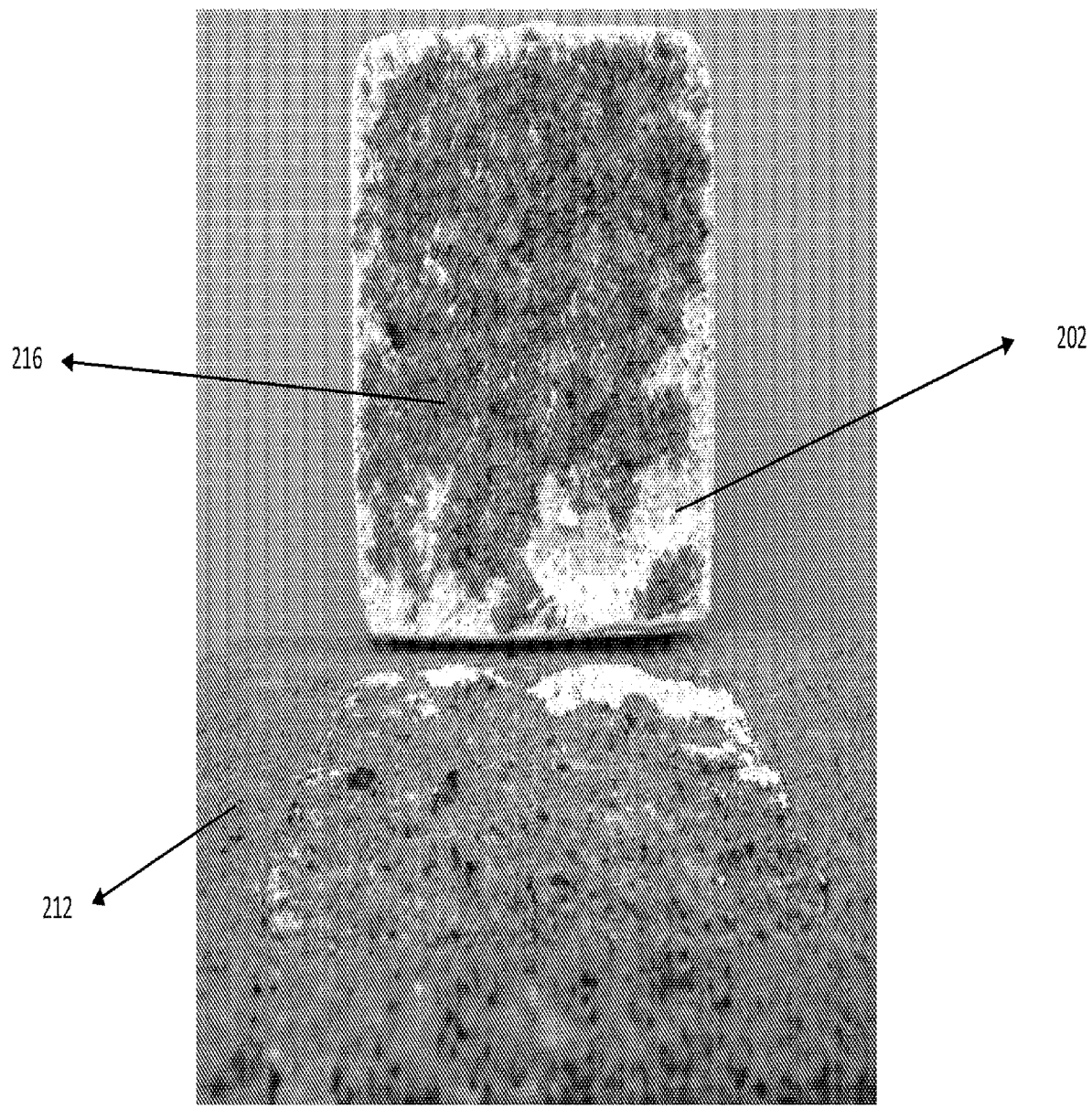

FIG. 2c is a more detailed photograph depicting the bond strength of the white increased polyamide hot-applied thermoplastic pavement marker [202], as applied to a concrete substrate [212], where significant failure of the substrate [216] is again shown.

Figure 3A:
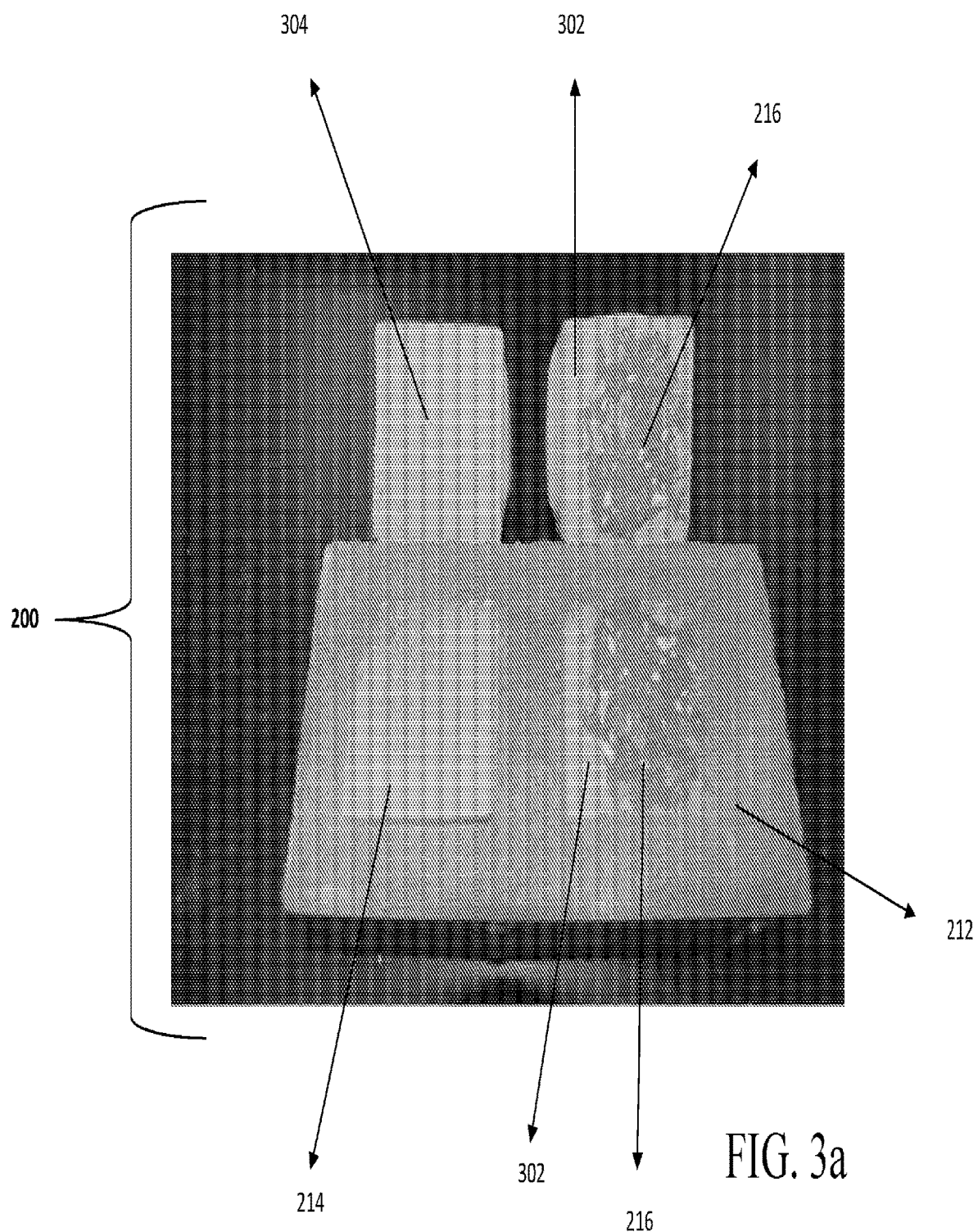
FIGS. 3a-3c are photographic comparisons of the bond strength of yellow hot-applied thermoplastic pavement marker with increased polyamide content and a conventional yellow AASHTO hot-applied thermoplastic pavement marker.

FIG. 3a is a photographic comparison of the bond strength test results [200] illustrating the differences between the yellow markers with increased polyamide content hot-applied thermoplastic [302] and the conventional AASHTO yellow hot-applied thermoplastic pavement marker [304], as applied to a concrete substrate [212]. The conventional AASHTO yellow hot-applied thermoplastic pavement marker [304] exhibited significant failure of the marking [214] while the yellow marker with increased polyamide content hot-applied thermoplastic [302] exhibited significant substrate failure [216].

Figure 3B:
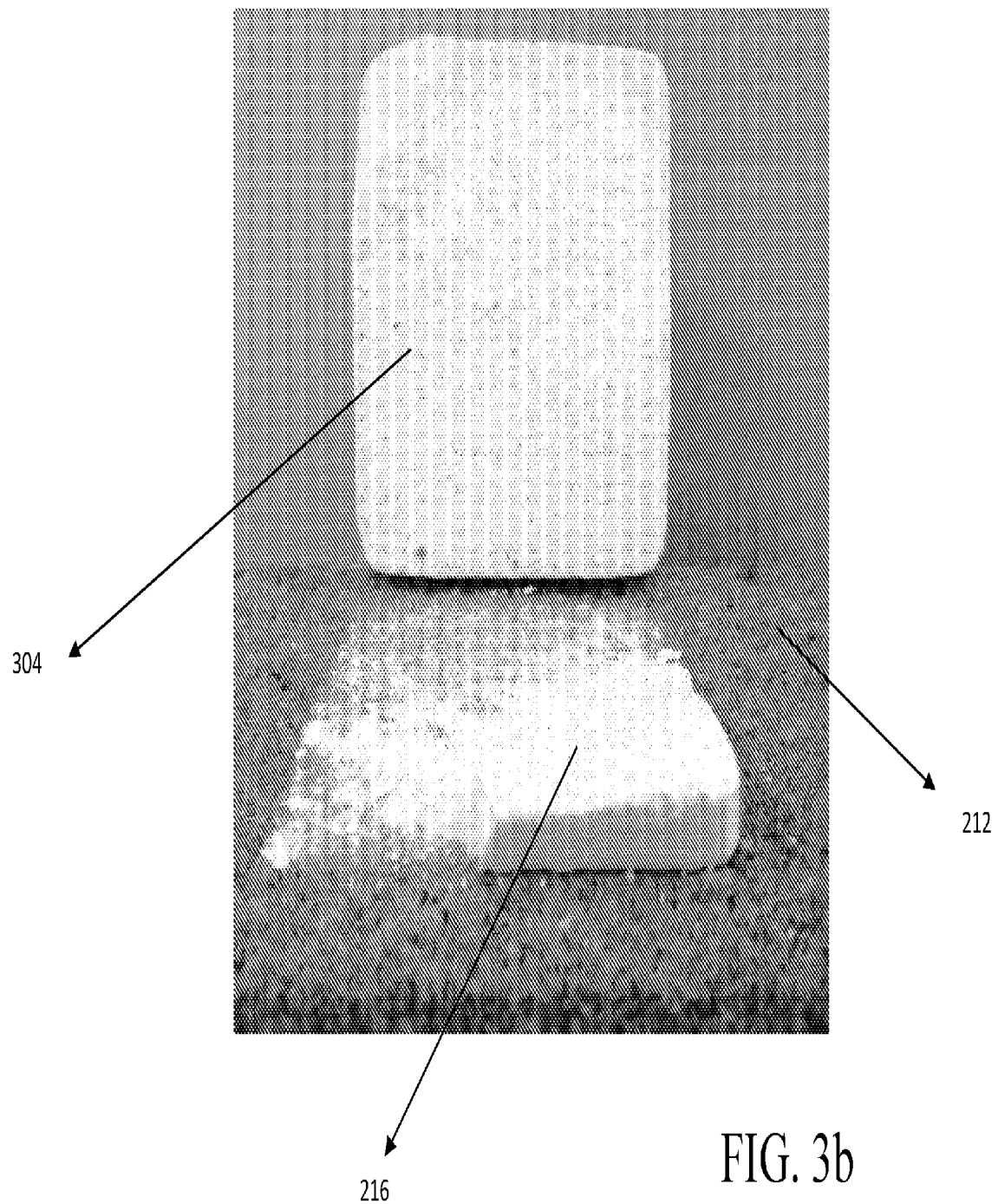
Figure 3C:
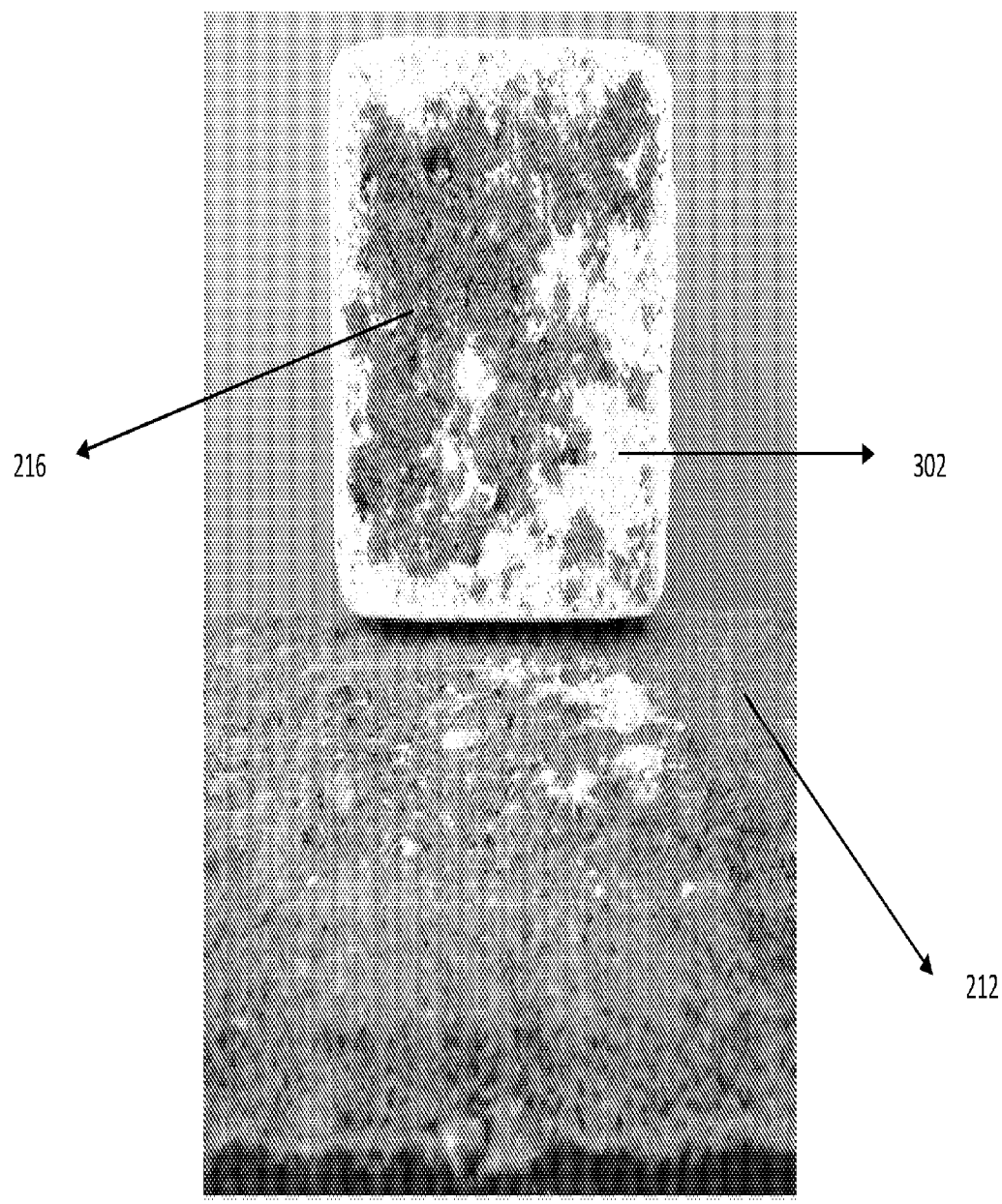

FIG. 3b provides a closer view of the bond strength difference with a conventional AASHTO yellow hot-applied thermoplastic pavement marker [304], as applied to a concrete substrate [212], where significant failure of the marking [214] is exhibited FIG. 3c is a photograph of the bond strength of the yellow increased polyamide hot-applied thermoplastic pavement marker [302], as applied to a concrete substrate [212], illustrating significant failure of the substrate [216].

FIGS. 4a through 4d yield photographic records of the Abrasion test results [400] for a conventional and improved hot-applied thermoplastic marking. The conventional AASHTO white hot-applied thermoplastic pavement marker

Figure 4A:
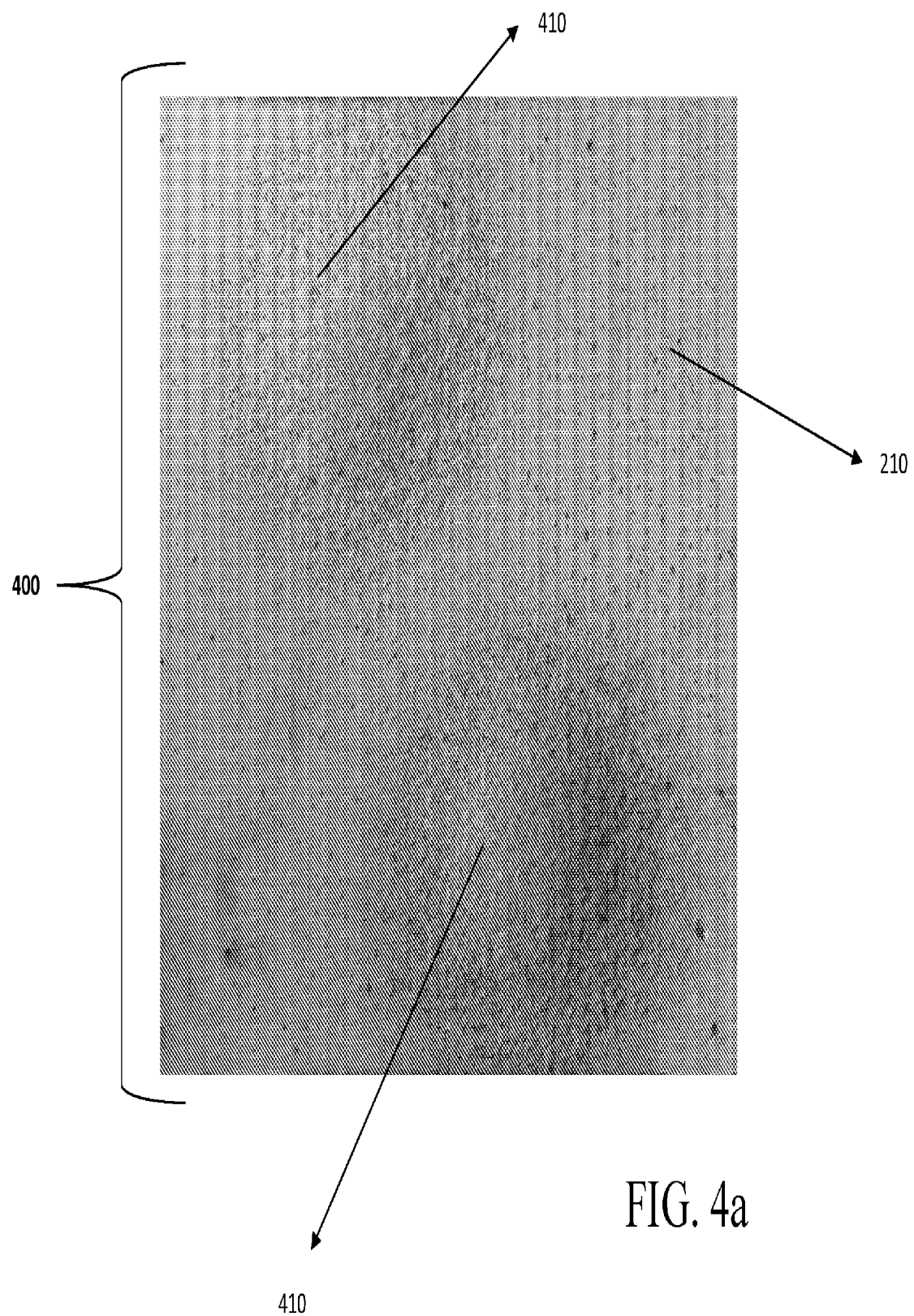
FIGS. 4a-4d provide photographic records of the Abrasion test results for white and yellow conventional AASHTO and increased polyamide content hot-applied thermoplastic pavement markers.
Figure 4B:
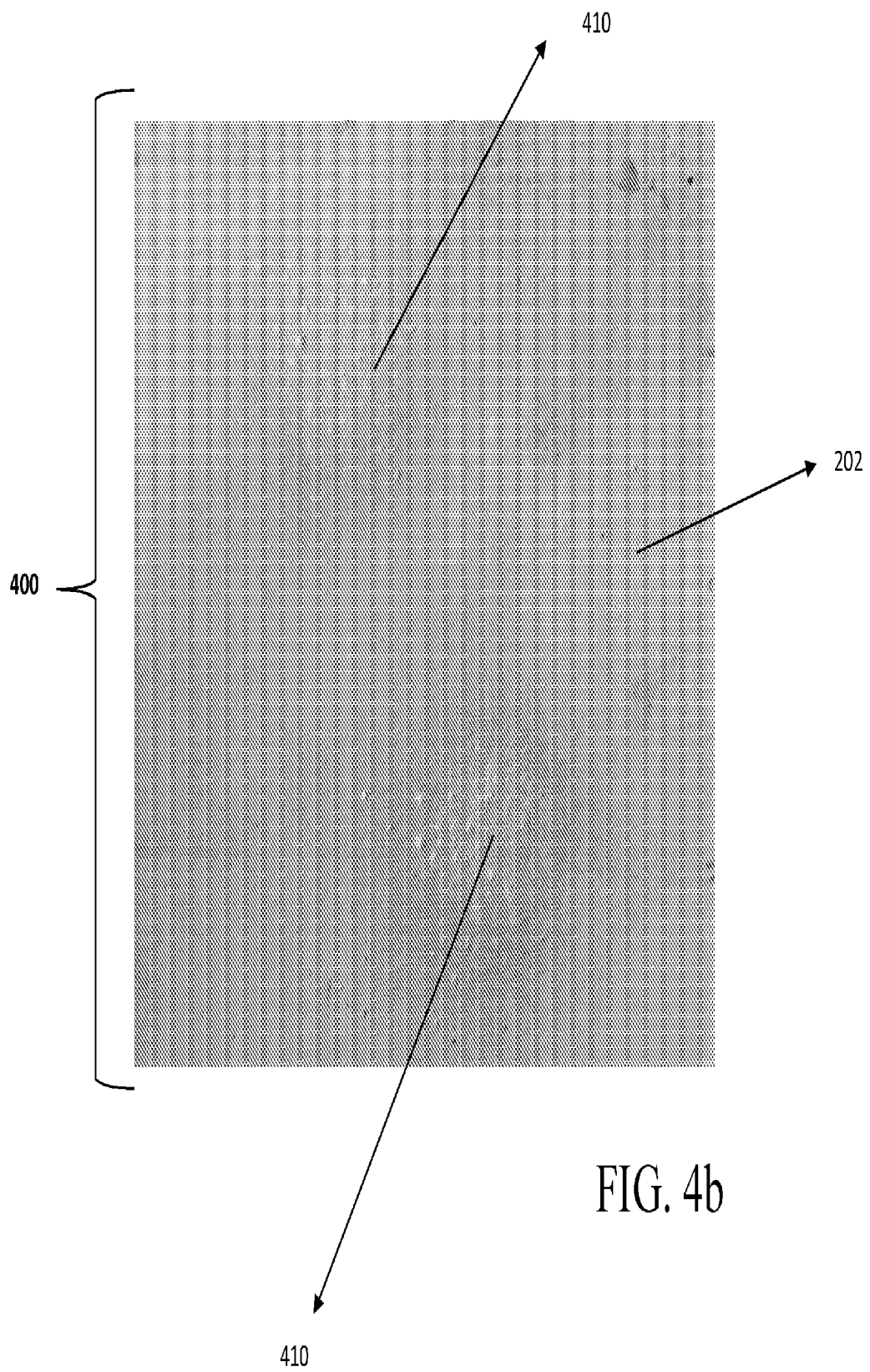
Figure 4C:
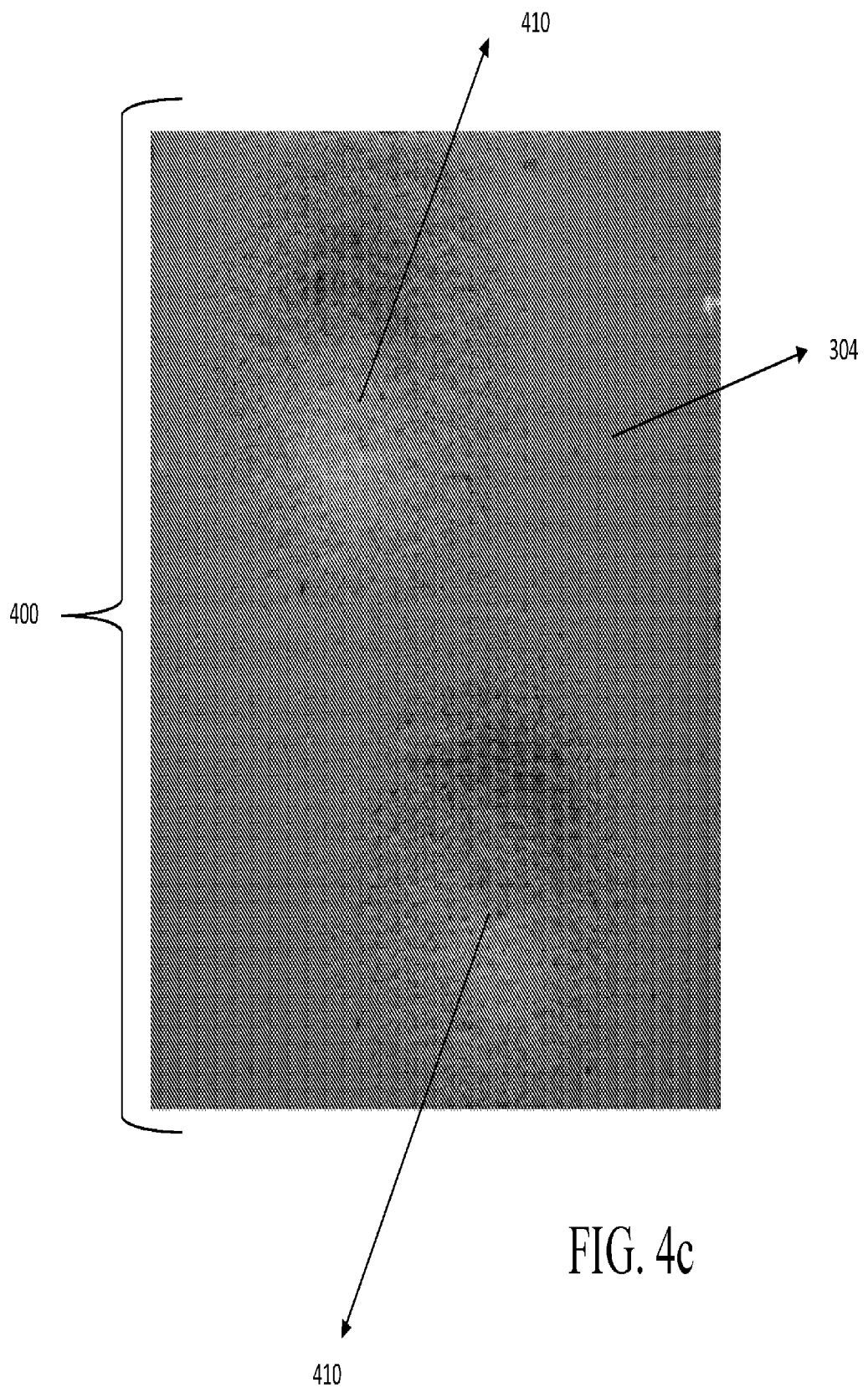
Figure 4D:
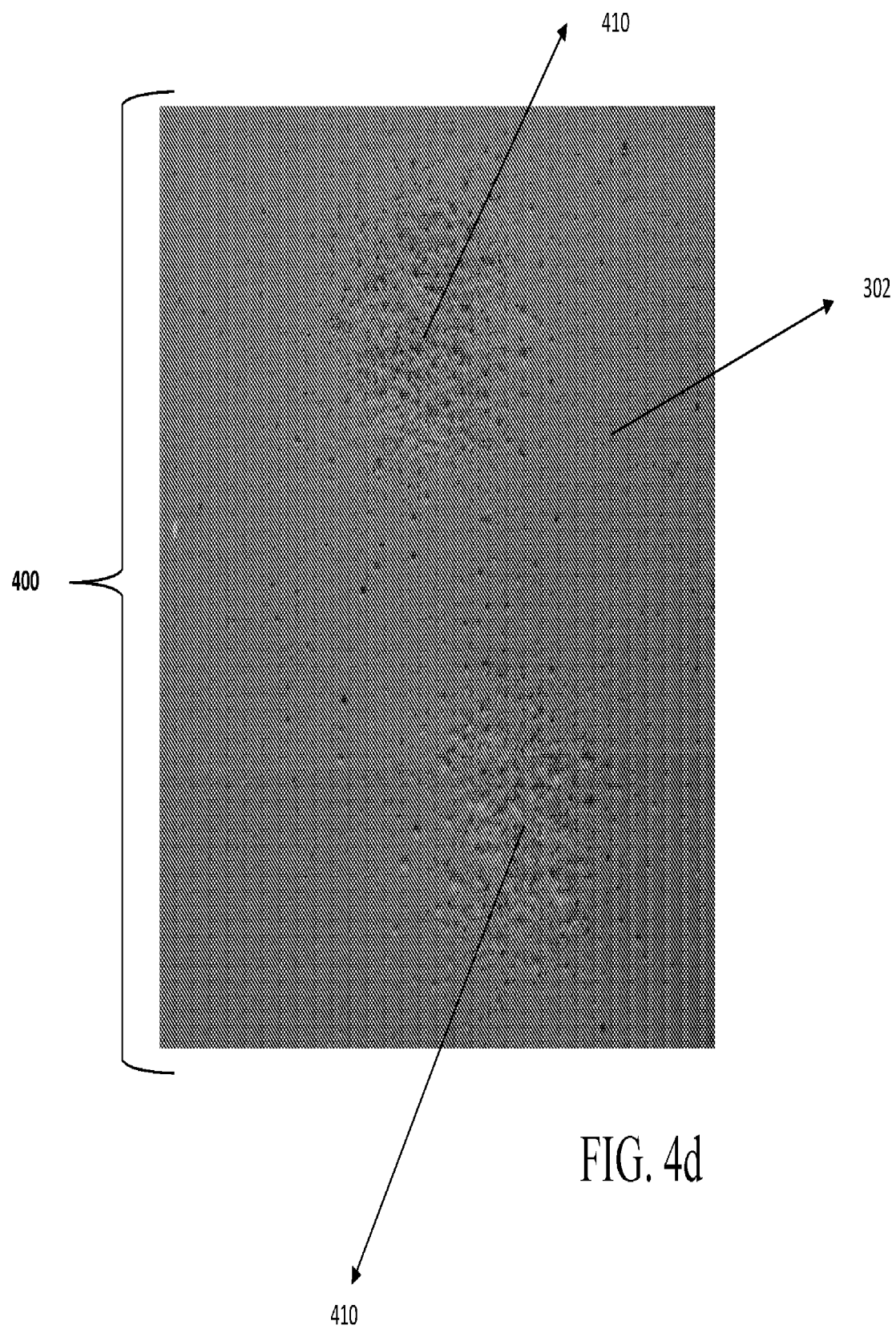

[210], serving as a control, was prepared as a hot-application mold to a base plate (not shown). FIG. 4a provides an abrasive blasting of the hot-application mold to a base plate showing significant wear of the conventional AASHTO white hot-applied thermoplastic marker [210] as evidenced by heavily abraded regions [410]. FIG. 4b provides the Abrasion test results [400] for a white increased polyamide hot-applied thermoplastic pavement marker [202]. The abrasive blasting of the increased polyamide content marker shows minimal wear, as evidenced by the scantily abraded regions [410] of the hot-application mold to a base plate. FIGS. 4c and 4d offer photographic records of the Abrasion test results [400] for a conventional AASHTO yellow hot-applied thermoplastic pavement marker [304], serving as a control, and a yellow increased polyamide hot-applied thermoplastic pavement marker [302].

Figure 5A:
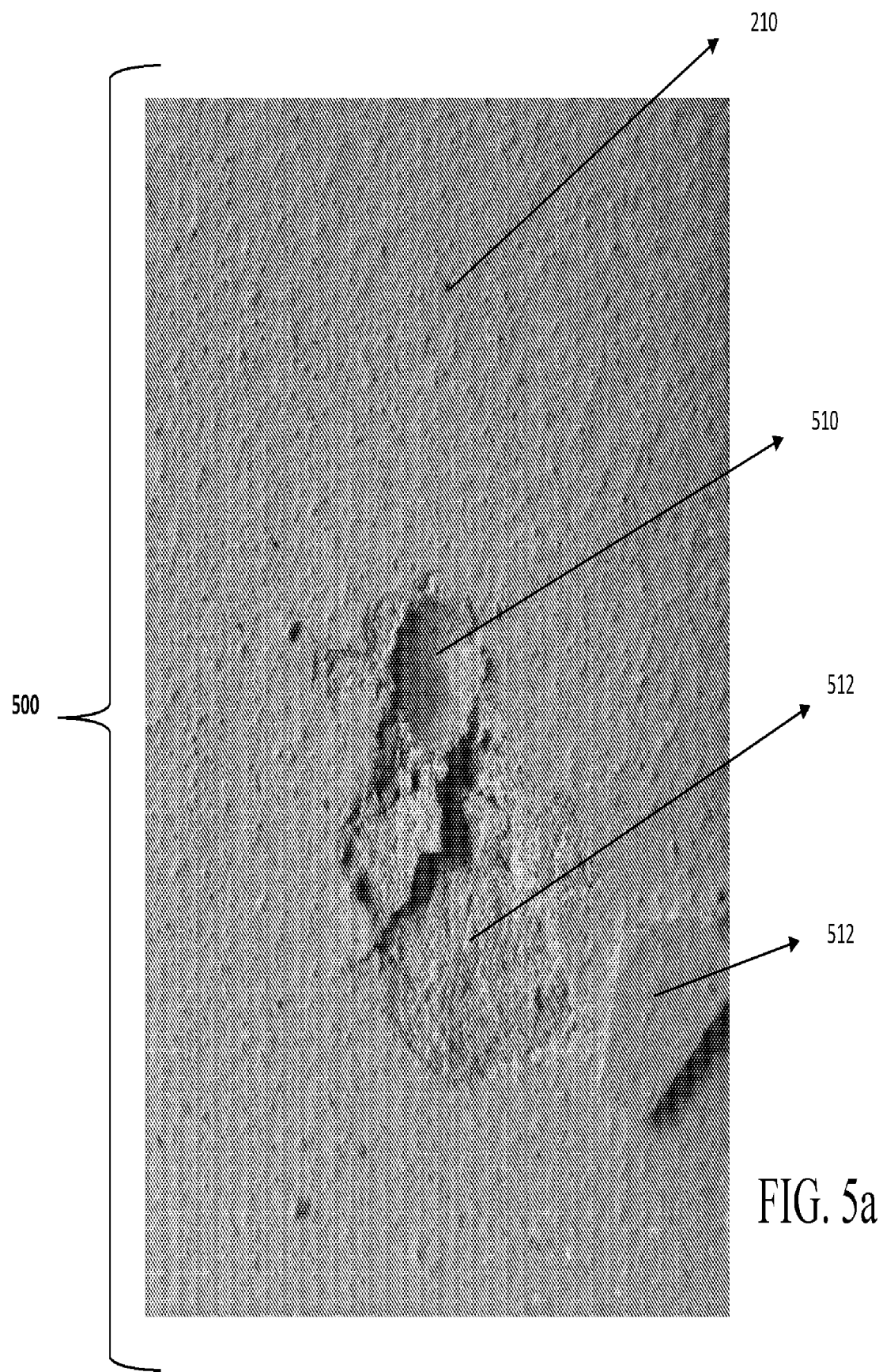
FIGS. 5a-5d are photographic records of the Gardner Impact test results, at 0° C., for white and yellow conventional AASHTO and increased polyamide content hot-applied thermoplastic pavement markers.
Figure 5B:
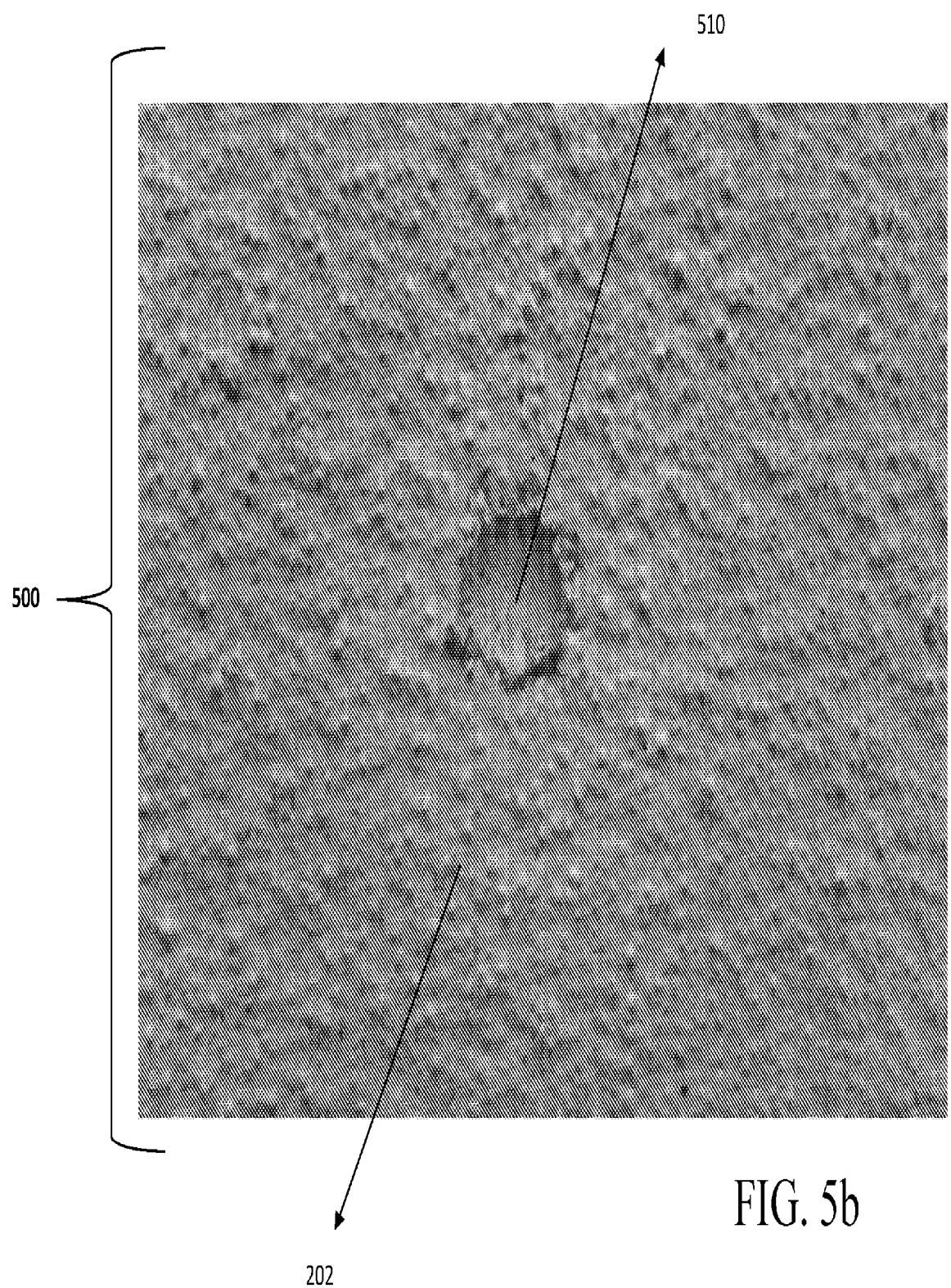
Figure 5C:
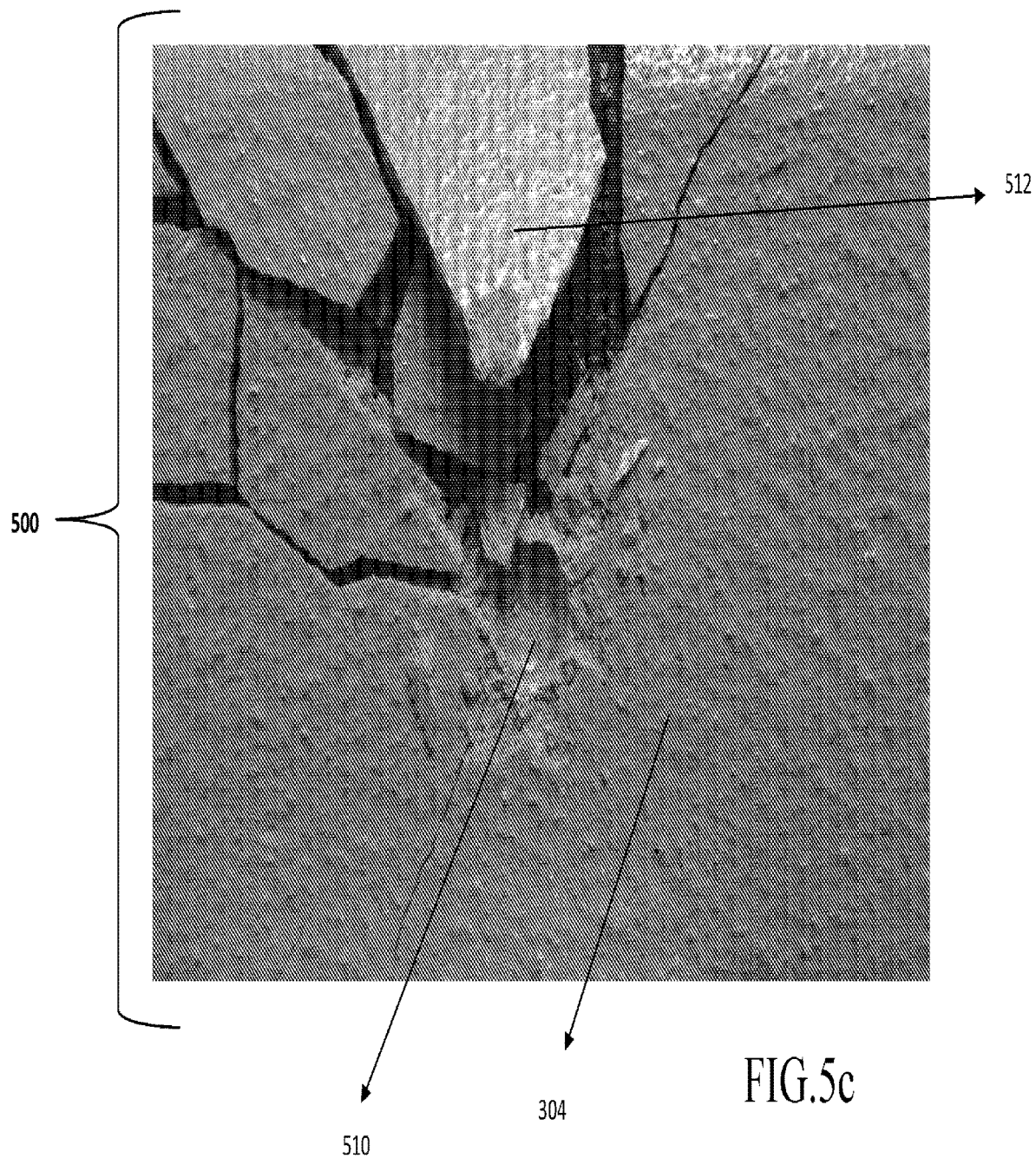
Figure 5D:
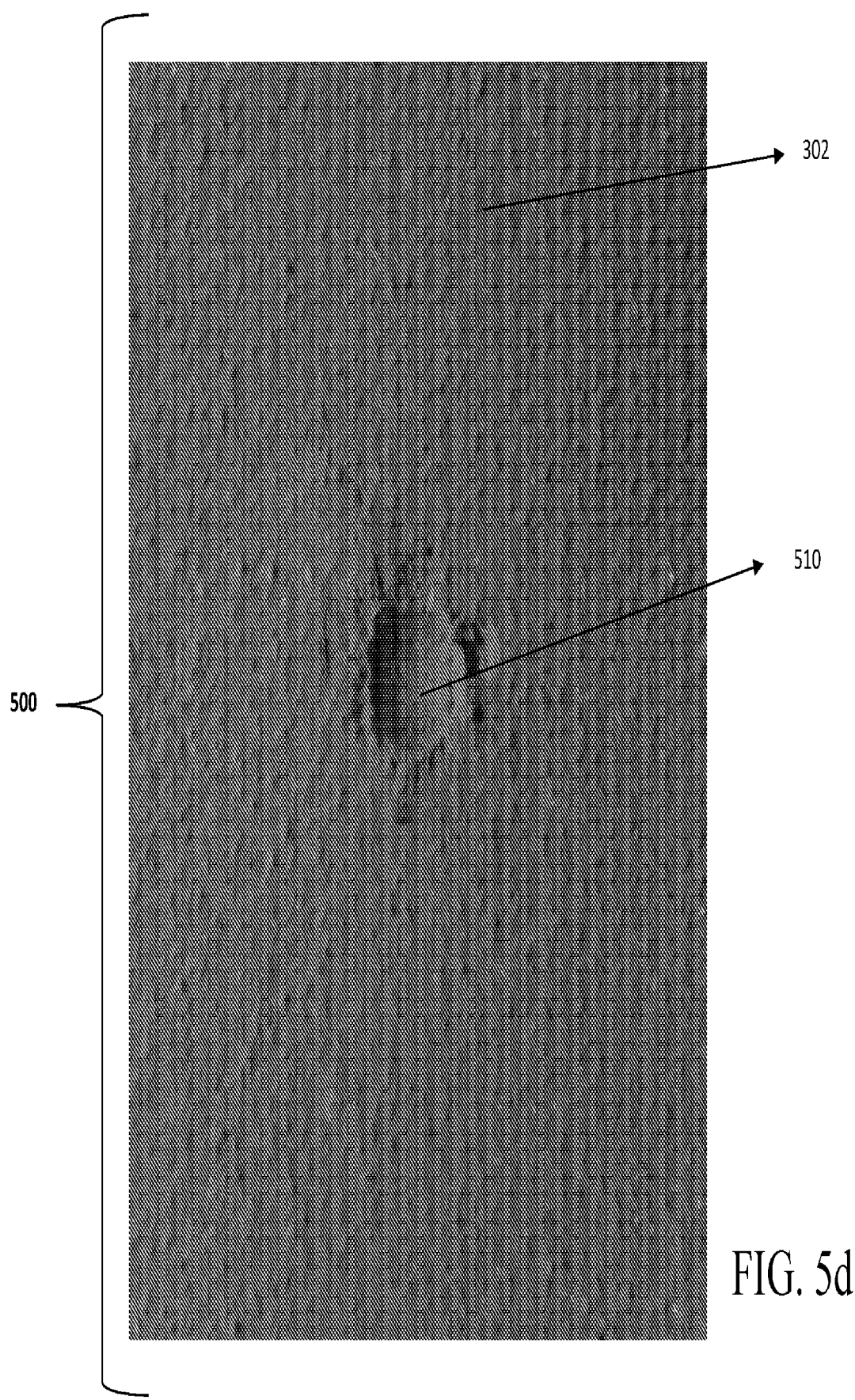

FIGS. 5a through 5d provide the Gardner impact test results, at 0° C., for the conventional and increased polyamide content hot-applied thermoplastic pavement markers. FIG. 5a shows the Gardner Impact test results at 0° C. [500] for a conventional AASHTO white hot-applied thermoplastic pavement marker [210], while FIG. 5b is a photographic record of the Gardner Impact test results [500] for a white pavement marker with increased polyamide hot-applied thermoplastic [202]. FIG. 5c shows the Gardner Impact test results [500] for a conventional AASHTO yellow hot-applied thermoplastic pavement marker [210], while FIG. 5d yields a photographic record of the Gardner Impact test results [500] for a yellow increased polyamide hot-applied thermoplastic pavement marker [202]. Each sample provides a point of impact [510]; however, the conventional white [210] and conventional yellow AASHTO yellow hot-applied thermoplastic markers display in impact failure [512] that is not evidenced with the white [202] and yellow [302] increased polyamide content hot-applied thermoplastic markers.

WORKING AND COMPARATIVE EXAMPLES

In order to more precisely describe representative compositions of the present disclosure, example formulations of the hot-applied thermoplastic are provided, in total weight percent, in the following working examples:

Working Example 1

Material Composition—White Extrude ($W_{Ex}$)

| | |
|---|---|
| Polyamide (2526c-01) | 7.0% |
| Maleic modified rosin (Arizona 7021) | 10.0% |
| EVA Copolymer (Exxon UL7510) | 1.0% |
| Polyethylene Wax (Coschem CS-42F) | 2.0% |
| Plasticizer (Castor Oil #1 Raw) | 2.0% |
| HALS (Unitechem 622) | 0.2% |
| Antioxidant (BASF Iraganox 1010) | 0.2% |
| TiO2, Rutile Type II (Tronox CR-828) | 12.0% |
| Blue Pigment 29 (Nubiola CP-84) | 0.025% |
| Fumed Silica (Evonik Aerosil R208) | 0.5% |
| Calcium Carbonate (Huber G260A) | 15.075% |
| Beads Type 3 (Weissker AASHTO M 247-11, 80% rounds, dual coated) | 25.0% |
| Beads Type 1 (Weissker AASHTO M 247-11, 80% rounds, dual coated) | 25.0% |
| Total % | 100.00% |
| Total % Binder | 22.0% |
| Total % Beads | 50.0% |

The material can be applied, as an extrudate, at a thickness of 60-150 mil and an application temperature of 400-440° F., as is the general requirement for a hot-applied thermoplastic composition for pavement marking.

White extrudate of the composition provided above was applied on a pavement marking industry test site (AASHTO NTPEP Test Deck, Asphalt and Concrete, Minnesota, Jul. 31, 2013) at a thickness of 90-120 mil at a temperature of 400-440° F. A top dressing of drop-on beads was applied as follows: 8-12 lbs./100 ft$^2$ Type 4 beads, 4-8 lbs./100 ft$^2$ Type 1 beads. Application of the marking material was performed by the use of a hand liner extrusion.

Working Example 2

Material Composition—Yellow Extrude ($Y_{Ex}$)

| | |
|---|---|
| Polyamide (2526c-01) | 7.0% |
| Maleic modified rosin (Arizona 7021) | 9.75% |
| EVA Copolymer (Exxon UL7511) | 1.2% |
| Polyethylene Wax (Coschem CS-42F) | 2.25% |
| Plasticizer (Castor Oil #1 Raw) | 1.8% |
| HALS (Unitechem 622) | 0.4% |
| Antioxidant (BASF Iraganox 1010) | 0.2% |
| TiO2, Rutile Type II (Tronox CR-828) | 1.4% |
| Yellow 83 Pigment (Clariant HRT) | 1.1% |
| Calcium Carbonate (Huber G260A) | 24.9% |
| Beads Type 3 (Weissker AASHTO M 247-11, 80% rounds, dual coated) | 25.0% |
| Beads Type 1 (Weissker AASHTO M 247-11, 80% rounds, dual coated) | 25.0% |
| Total % | 100.00% |
| Total % Binder | 22.0% |
| Total % Beads | 50.0% |

Yellow extrudate of the composition provided above was applied on a pavement marking industry test site (AASHTO NTPEP Test Deck, Asphalt and Concrete, Minnesota, Jul. 31, 2013) at a thickness of 90-120 mil at a temperature of 400-440° F. A top dressing of drop-on beads was applied as follows: 8-12 lbs./100 ft$^2$ Type 4 beads, 4-8 lbs./100 ft$^2$ Type 1 beads. Application of the marking material was performed by hand liner extrusion.

Working Example 3

White High Performance Pavement Marker (See Table 4a)

| | |
|---|---|
| Polyamide (2526c-01) | 7.0% |
| Maleic modified rosin Ester (highly maleated) | 10.3% |
| EVA Copolymer | 0.5% |
| Polyethylene Wax (Coschem CS-14N) | 2.0% |
| Ethylene Maelic Anhydride | 0.5% |
| HALS (Unitechem 622) | 0.2% |
| Antioxidant (BASF Iraganox 1010) | 0.2% |
| DINP | 1.7% |
| TiO2, Rutile Type II (Tronox CR-828) | 12.0% |
| Blue Pigment 29 (Nubiola CP-84) | 0.0125% |
| Calcium Carbonate (Huber G260A) | 15.5875% |
| Beads Type 3 (Weissker AASHTO M 247-11, 80% rounds, dual coated) | 25.0% |
| Beads Type 1 (Weissker AASHTO M 247-11, 80% rounds, dual coated) | 25.0% |
| Total % | 100.00% |
| Total % Binder | 22.0% |
| Total % Beads | 50.0% |

For working Example 3, a full set of testing was performed by Future Labs of Madison, Miss., regarding a white thermoplastic W5E-5X-AA Sample A provided by Ennis-Flint. The results are shown in Table 3 below. These test results confirm the use of greater than 50% glass content with a complete binder content of 22.31 wt. %, for which 7 wt. % polyamide content was used in the overall final composition. Reflectance was reported per ASTM D 4960 as 83.12% using a Type 3 and Type 1 50% bead content (25% each). Impact resistance at ambient and cool-weather conditions (32° F. and 75° F.) was reported as 10.10 in. lbs. and 12.000 in. lbs., respectively, and low temperature resistance, tested per AASHTO T 250, exhibited no cracks. The sand blast abrasion test, also referred to as the box abrasion test, provided a 0.1 g loss, while the taber abrasion test provided a 118 mg loss. The bond strength of the white improved thermoplastic was tested with primer, with no primer and with primer and extended cure. The bond strength results were obtained per ASTM D 4796 and showed 50% failure of the concrete substrate at 443 psi with the use of no primer. Using a primer, the bond strength was determined to provide 90% failure of the primer-thermoplastic joining at 255 psi. The combined use of a primer and allowance for extended curing also provided a 90% failure of the primer-thermoplastic joining at 335 psi.

TABLE 3

| Test Methods | Specification | Results |
| --- | --- | --- |
| Binder Content | ASTM D 4797 | 22.31% |
| Glass Bead Content | ASTM D 4797 | 50.94% |
| TiO2 Pigment Content (assuming >92% TiO2 Purity) | ASTM D 4764 | 21.63% |
| Color after 4 hrs (@ 425° F.) | AASHTO T 250 | Matches Fed. Std. 17886 |
| Reflectance | ASTM D 4960 | 83.12% |
| Yellowness Index | ASTM E 313 | 0.05 |
| Softening Point | ASTM D 36 | 204° F. |
| Impact Resistance (@ 32° F.) | ASTM D 4812 | 10.10 in. lbs. |
| Impact Resistance (@ 75° F.) | ASTM D 4812 | 12.00 in. lbs. |
| Low Temp Resistance | AASHTO T 250 | no cracks |
| Specific Gravity | ASTM D 792 | 1.98 |
| Inert Filler |  | 5.12% |
| Flowability (4 hrs) | AASHTO T 250 | 10.62% |
| Extended Flowability (8 hrs) | AASHTO T 250 | 8.72% |
| Drying Time (@ 50° F.) | ASTM D 711 | <2 minutes |
| Drying Time (@ 90° F.) | ASTM D 711 | <10 minutes |
| Drop Impact (@ 32° F.) | ASTM D 5420 | PASS |
| Drop Impact (@ 75° F.) | ASTM D 5420 | PASS |
| Sand Blast Abrasion | CTM 423 | 0.1 g loss |
| Taber Abrasion | ASTM D 4060 | 118 mg loss |
| Tensile Strength (avg of 3) | ASTM D 638 | 233 psi |
| Tensile Elongation (avg of 3) | ASTM D 638 | 43.70% |
| Compressive Strength (avg of 3) | ASTM D 695 | 961 psi |
| Bond Strength (no Primer) | ASTM D 4796 | 443 psi/50% Concrete Failure |
| Bond Strength (with Primer) | ASTM D 4796 | 255 psi/90% Primer-Thermo Failure |
| Bond Strength (Primer & Extended Cure) | ASTM D 4796 | 335 psi/90% Primer-Thermo Failure |
| Pull Test | FL DOT 971-7.9 | PASS |
| Flexibility | ASTM D 3111 | PASS |

Product: Working Example #5 (Future Labs, LLC, Madison, MS; Results dated Jan. 24, 2014)

Working Example 4

See Table 4—referred to as "Yellow High Performance"

| | |
| --- | --- |
| Polyamide (2526c-01) | 7.0% |
| Maleic modified rosin ester (highly maleated) | 9.7% |
| EVA Copolymer (Exxon UL7510) | 1.25% |
| Polyethylene Wax (Coschem CS-42F) | 2.25% |
| Plasticizer (Castor Oil #1 Raw) | 1.8% |
| HALS (Unitechem 622) | 0.4% |
| Antioxidant (BASF Iraganox 1010) | 0.2% |
| TiO2, Rutile Type II (Tronox CR-828) | 1.35% |
| Yellow 83 Pigment (Clariant HRT) | 1.25% |
| Calcium Carbonate (Huber G260A) | 24.8% |
| Beads Type 3 (Weissker AASHTO M 247-11, 80% rounds, dual coated) | 25.0% |
| Beads Type 1 (Weissker AASHTO M 247-11, 80% rounds, dual coated) | 25.0% |
| Total % | 100.00% |
| Total % Binder | 23.425% |
| Total % Beads | 50.0% |

Working Example 5

Referred to in Table 4 as "Yellow High Performance"

| | |
| --- | --- |
| Polyamide (2526c-01) | 7.0% |
| Maleic modified rosin ester (highly maleated) | 10.5% |
| EVA Copolymer (Exxon UL7510) | 0.25% |
| Polyethylene Wax (Coschem CS-14N) | 2.2% |
| Ethylene Maleic Anhydride | 0.25% |
| Plasticizer (Castor Oil #1 Raw) | 1.8% |
| HALS (Unitechem 622) | 0.4% |
| Antioxidant (BASF Iraganox 1010) | 0.2% |
| TiO2, Rutile Type II (Tronox CR-828) | 1.35% |
| Yellow 83 Pigment (Clariant HRT) | 1.25% |
| Calcium Carbonate (Huber G260A) | 24.8% |
| Beads Type 3 (Weissker AASHTO M 247-11, 80% rounds, adhesion coated) | 25.0% |
| Beads Type 1 (Weissker AASHTO M 247-11, 80% rounds, dual coated) | 25.0% |
| Total % | 100.00% |
| Total % Binder | 22.0% |
| Total % Beads | 50.0% |

Comparative Example 1

As an illustration, Comparative Example 1 uses a lower percentage by weight of polyamide Permaline is a proprietary formulation manufactured by Ennis-Flint, using a polyamide content of less than 3% and rosin ester combinations, filler and additional additives including, polymer(s), wax(s) and vegetable oil(s) and demonstrating a 30% Type 1 glass bead content by weight.

Comparative Example 2

As a further illustration, Comparative Example 2 is an AASHTO conventional yellow formulation that uses no polyamide, and is referred to in Table 4 as "Yellow AASHTO M 249"

| | |
| --- | --- |
| Binder | 18.0% min. |
| Glass Bead | 30-40% |
| Calcium Carbonate and inert fillers | ** |
| Yellow Pigments | ** |

**Per AASHTO Designation M 249-09, the amount of yellow pigment, calcium carbonate, and inert fillers shall be at the option of the manufacturer, providing all other requirements of the specification are met.

Comparative Example 3

In yet another comparative illustration, Comparative Example 3 is an AASHTO conventional white formulation that uses no polyamide, and is referred to in Table 4 as "White AASHTO M 249"

| Binder | 18.0% min. |
| Glass Bead | 30-40% |
| TiO2 | 10.0% min. |
| Calcium Carbonate and inert fillers | 42.0% max. |

Formulation differences in the AASHTO conventional compositions and the improved polyamide containing hot-applied thermoplastic marking material, as detailed in the working examples are provided in Table 4.

All of the newly disclosed compositions completely replace the use of a maleic modified rosin ester and rosin ester with the use of a highly maleated maleic modified rosin ester and ethylene maleic anhydride. The new compositions also show the inclusion of a hindered amine light stabilizer (HALS) and an antioxidant. The amount of calcium carbonate required for the new formulations is at least half or more of the amount provided in the conventional AASHTO formulations.

TABLE 4

| % Wt. | White AASHTO M 249 | White High Performance | Yellow AASHTO M 249 | Yellow High Performance | Yellow High Performance (Alternate) |
|---|---|---|---|---|---|
| TiO2 (Rutile) | 10 | 12 | 1.5 | 1.35 | 1.35 |
| Blue Pigment | 0.005 | 0.0125 | 0 | 0 | 0 |
| Yellow 83 Pigment | 0 | 0 | 0.75 | 1.25 | 1.25 |
| Maleic Modified Rosin Ester | 8.55 | 0 | 8.55 | 0 | 0 |
| Maleic Modified Rosin Ester (highly maleated) | 0 | 10 | 0 | 9.7 | 10.25 |
| Rosin Ester | 7.5 | 0 | 8.25 | 0 | 0 |
| Polyamide | 0 | 7 | 0 | 7 | 7 |
| PE Wax | 0.5 | 2 | 0.25 | 2.25 | 2.35 |
| Ethylene Maleic Anhydride | 0 | 0.5 | 0 | 0 | 0.25 |
| EVA | 0.25 | 0.5 | 0.25 | 1.25 | 0.25 |
| HALS | 0 | 0.2 | 0 | 0.4 | 0.4 |
| Antioxidant | 0 | 0.2 | 0 | 0.2 | 0.2 |
| Type 3 Glass Beads | 0 | 25 | 0 | 25 | 25 |
| Type 1 Glass Beads | 30 | 25 | 30 | 25 | 25 |
| Castor Oil | 2.2 | 0 | 2.2 | 1.8 | 1.8 |
| DINP | 0 | 2 | 0 | 0 | 0 |
| Calcium Carbonate | 41.595 | 15.5875 | 48.25 | 24.8 | 24.4 |
| Total | 100 | 100 | 100 | 100 | 100 |
| % Binder | 19 | 22.00 | 19.5 | 23.425 | 22.00 |

Test Methodology

Testing methods used to determine the improved characteristics of the disclosed polyamide composition in comparison with current thermoplastics include Abrasion testing, Gardner Impact testing and NTPEP desk deck application NTPEP evaluations conducted in the field include retro-reflectivity, durability, daytime color, nighttime color (for yellow materials) and wet night retro-reflectivity for products that are permanent or temporarily applied.

Gardner Impact, also known as Falling Dart Impact, is a traditional method for the evaluation of impact strength or toughness of a plastic material. The test is often used to specify appropriate materials for applications involving impact or to evaluate the effect of secondary finishing operations or other environmental factors on plastic impact properties.

The test sample is placed on a base plate over an opening of specified diameter. An "impactor" sits on top of the test sample with a nose of specified radius in contact with the center of the test sample. A weight is raised inside a guide tube to a predetermined height, and then released to drop onto the top of the impactor, forcing the nose through the test sample. The drop height, drop weight, and the test result (pass/fail) are recorded. For this disclosure, ASTM Standard D4812-11, entitled "Standard Test Method for Unnotched Cantilever Beam Impact Resistance of Plastics", was followed using a two (2) pound drop weight from a height of 5.05 in per pound.

The Box Abrasion test was employed as described in California Test 423 (CTM 423 or CALTRANS Method) entitled "Method for Testing Thermoplastic Traffic Line Material", Part 14, Abrasion Test (Dec. 1, 2006). As described in the standard, CTM 423 14.A.2, the abrasive media used were glass beads having a gradation size of 100% pass-through of a #25 sieve (710 micron) and 100% retention on a #30 sieve (590 micron). Glass beads (400 g.) were directed at the hot-applied thermoplastic at a pressure of 40 psi and a specimen distance of 4⅞" from the spray nozzle per CTM 423 14.B.5 and CTM 423 14.B.7. The specimen is then rotated approximately 90 degrees from the original position and a new corner of the sample is subjected to abrasive blasting with the specified glass beads. The loss of each corner is measured for each of the four corners of the sample. Conventionally, a loss of 7-8 grams is considered normal wear resistance and optimal for applications provided herein, and a maximum deviation of 0.5 g is tolerated among the corners. A determined loss of 10 g is considered by the CALTRANS Method to be a failure.

Improvements in durability and significantly increased wear resistance versus that of conventional and available AASHTO hot-applied thermoplastics and Permaline® are provided in Table 5.

TABLE 5

| Test Method | Conventional Thermoplastic | Permaline ® | Improved Hot Applied |
|---|---|---|---|
| Abrasion (g.) | 4-10 | 2.5-4.0 | 0-0.5 |
| Gardner Impact, RT (in-lb.) | 0-15 | 15-30 | 40-100 |
| Gardner Impact, 0° C. (in-lb.) | 0-10 | 10-20 | 15-40 |

As seen in Table 5, the high impact resistance advantage is apparent for the polyamide-based road marking product over the currently available hot-applied thermoplastic markings as seen by the vast improvement in the low-temperature and ambient temperature measurements of the Gardner Impact test. In addition, the increase in wear resistance (i.e. highly resistant to road traffic tire wear) is evidenced by the results of the Abrasion test, where significant reduction in gram loss is shown.

The National Transportation Product Evaluation Program (NTPEP) tests and reports the results of pavement marking material performance to AASHTO member states. According to the NTPEP Pavement Marking Materials (PMM) and Data Usage Guide, all performance testing is performed on an asphalt concrete roadway and a Portland cement concrete roadway, known as "test decks". These "test decks" are located at snowplow (northern state) and non-snowplow (southern state) test sites where field evaluations of the applied product are recorded. Evaluations on temporary products are conducted for a period of six (6) months, while permanent markings are evaluated for three (3) years. Application specifications of the markings, for example bead type, application rate, and application thickness, are recorded, as are conditions during application such as air/surface temperatures and humidity. Test Deck product comparisons are undertaken in compliance with ASTM Standard D713-12.

Readings taken from the test deck at specified areas of the applied marking are termed either the "skip" reading or the "wheel" reading. The "skip" reading is taken from the marking closest to the skip line of the road. Readings taken in the wheel path closest to the skip line of the road are provided as "wheel" readings. A visual representation of a conventional test deck configuration is as provided and described by FIG. 1.

Retroreflectivity

Retroreflectivity is the ability of a retroreflector (e.g. glass bead or reflective prism) to reflect light back to its source with minimal scattering. Dry and wet retroreflectivity readings are taken from the test deck. Dry retroreflectivity readings are taken from the first nine (9) inches of the skip line and in the wheel path closest to the skip line. Wet retroreflectivity is a measure of a marking's ability to 'recover' following a rain event, and is measured after a timed interval following a period of 'wetting down' by a portable garden hose. "Wet" readings are taken in the first nine (9) inches of the line closest to the road edge line and are taken in accordance with ASTM Standard E2177-11, entitled "Standard Test Method for Measuring the Coefficient of Retro-reflected Luminance ($R_L$) of Pavement Markings in a Standard Condition of Wetness". Retro-reflectivity readings taken from the 'skip area' should be considered as a representation of long line retro-reflectivity performance, while 'wheel track' data can be considered for lines used in a longitudinal fashion (e.g. stop bars, cross walks, legends, signage, and areas of excessive wear due to braking, stopping and turning movements. 'Wheel track' measurements can also be used to determine the future wear reflectivity under accelerated wear conditions.

Day and Nighttime Color

Transverse and longitudinal markings can be evaluated for color compliance, color fastness related to weathering and fading in accordance with ASTM Standard D6628. Daytime and nighttime color readings are recorded as chromaticity values of x and y coordinates. Luminance factors, the measure of the lightness of a marking, are also recorded.

Durability

Durability is rated on a scale of one (1) to ten (10), with ten (10) being the best rating to be obtained by a road marking. A durability rating is obtained through examination of an eighteen (18) inch length of line centered on the wheel track area (the "wheel" reading) and the nine (9) inches of the skip line area (the "skip" reading). A percentage of the marking material remaining in this area is translated to a rating scale of one (1) to ten (10). Durability ratings are obtained in accordance with ASTM D913. Data obtained by this method can be used to determine the 'toughness' of a pavement marking binder under long-term field conditions and weathering. Bead retention is not implied by this measurement.

Application of the provided Working Examples 1-5 on a pavement marking industry test site (AASHTO NTPEP Test Deck, Asphalt and Concrete, Minnesota, Jul. 31, 2013) exhibited excellent durability and retro-reflectiveness after three (3) months, the results of which are as summarized in in Table 6. These initial values will be exceeded for both the initial and retained retroreflective properties of the higher content (up to 9%) polyamide hot-applied thermoplastic marker as these formulations have a higher bead content. The initial values from the 2013 Minnesota NTPEP Test Deck exceeded the minimums shown in Table 7 as well. Minimum requirements, by individual states, of retroreflective performance specifications require the use of Type 3 and Type 1 glass beads be incorporated into the thermoplastic marking material. The formulations of the working examples described herewithin include these in the compositions provided.

TABLE 6

Results of Testing for High Durable Formulations of Working Examples 1-4 - Initial and 3 Months after Application

| | White HD Asphalt | | White HD Concrete | | Yellow HD Asphalt | | Yellow HD Concrete | |
|---|---|---|---|---|---|---|---|---|
| | Skip | Wheel | Skip | Wheel | Skip | Wheel | Skip | Wheel |
| Retroreflectivity (mcd) | | | | | | | | |
| Initial | 649 | 718 | 695 | 777 | 332 | 385 | 341 | 373 |
| 3 months | 564 | 521 | 691 | 557 | 306 | 254 | 345 | 305 |
| Wet Retro (mcd) | | | | | | | | |
| Initial | | 118 | | 169 | | 25 | | 50 |
| 3 months | | 104 | | 54 | | 28 | | 53 |
| Durability (1-10) | | | | | | | | |
| Initial | 10 | 10 | 10 | 10 | 10 | 10 | 10 | 10 |
| 3 months | 10 | 10 | 10 | 10 | 10 | 10 | 10 | 10 |
| Nighttime Color (x, y) | | | | | | | | |
| Initial | | | | | .4936 | .4406 | .4925 | .4458 |
| 3 months | | | | | .4960 | .4442 | .4956 | .4457 |

TABLE 7

Initial and 3 Year Retain Retro-reflectivity Requirements for HD (High Durability) Formulations

|  | Florida White | Yellow | Alabama White | Yellow |
|---|---|---|---|---|
| Initial Retroreflectivity (mcd) | 450 min. | 350 min. | 450 min. | 300 min. |
| 3 Year Retained Retroreflectivity (mcd) | 150 min. | 150 min. | n/a | n/a |

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A hot applied thermoplastic pavement marking composition comprising:
    3 to 10 weight percent of a modified polyamide resin comprising a di-functional amine;
    a rosin-modified ester;
    a copolymer;
    30 to 70 weight percent of a glass bead intermix;
    1 to 15 weight percent of a white or yellow pigment; and
    one or more of a plasticizer, an inorganic filler, a wax, an antioxidant or a light stabilizer,
    wherein the ester comprises one or more of a pentaerythritol modified ester, a maleic modified glycerol rosin ester or ethylene maleic anhydride.

2. The composition of claim 1, wherein the glass bead intermix comprises AASHTO Type 1 glass beads and one of AASHTO Type 3 glass beads or AASHTO Type 4 glass beads.

3. A thermoplastic marking for a substrate comprising the composition of claim 1.

4. A thermoplastic marking for a substrate, the marking comprising:
    a polyamide resin comprising a di-functional amine;
    a rosin-modified ester;
    a copolymer; and
    up to 50 weight percent of a glass bead intermix comprising AASHTO Type 1 glass beads and one of AASHTO Type 3 glass beads or AASHTO Type 4 glass beads,
    wherein the marking has a softening point from 115° C. to 140° C.

5. The marking of claim 4, wherein the marking is a profiled marker that forms textures, bumps, profiles, or combinations thereof, wherein the profiled marker extends above a top surface of the substrate.

6. The marking of claim 5, wherein the profiled markers are configured to be located at varying intervals along a length of the substrate.

7. The marking of claim 4, wherein the marking is an inlaid marker, applied to grooves in a substrate, wherein the inlaid marker is substantially even with a top surface of the substrate.

8. The marking of claim 4, further comprising a plasticizer, an inorganic filler, a wax, a pigment, an antioxidant or a light stabilizer, or combinations thereof.

9. The marking of claim 4, wherein the marking comprises 3 to 10 weight percent of the polyamide resin.

10. The marking of claim 4, wherein the glass beads have a retro-reflectivity value that ranges from 200 to 2000 mcd/m$^2$/1x.

11. The marking of claim 4, wherein the marking has an Gardner Impact resistance value of greater than 15 inch-pounds at 0° C.

12. The marking of claim 4, wherein the marking has an Gardner Impact resistance value of 15 to 40 inch-pounds at 0° C.

13. The marking of claim 4, further comprising a top dressing of at least one of AASHTO Type 1 glass beads or AASHTO Type 4 glass beads.

14. The marking of claim 4, wherein the marking has abrasion loss in weight of less than 0.5 mg according to test California Test 423 (CTM 423).

15. A method for applying a thermoplastic marking to a substrate, comprising:
    heating the composition of claim 1; and
    applying a portion of the heated composition onto a substrate to form a thermoplastic marking.

16. The method of claim 15, further comprising applying a primer to the substrate prior to applying the composition.

17. The method of claim 16, wherein a bond strength between the thermoplastic marking and the primed substrate is greater than 250 psi at 90% failure according to ASTM D 4796.

18. The method of claim 16, wherein a bond strength between the thermoplastic marking and the substrate is greater than 400 psi at 50% failure according to ASTM D 4796.

19. The method of claim 15, further comprising applying a top dressing of glass beads to the thermoplastic marking on the substrate.

20. The method of claim 15, wherein the substrate comprises asphalt or concrete.

* * * * *